US012114192B2

(12) United States Patent
Wangler et al.

(10) Patent No.: US 12,114,192 B2
(45) Date of Patent: *Oct. 8, 2024

(54) SYSTEM AND METHOD FOR DISTRIBUTED NETWORK PERFORMANCE MANAGEMENT

(71) Applicant: 7SIGNAL, INC., Independence, OH (US)

(72) Inventors: Russell S. Wangler, Lewis Center, OH (US); Joseph Tennant, Wadsworth, OH (US); Nathan Cain, Northfield, OH (US); Veli-Pekka Ketonen, Aurora, OH (US)

(73) Assignee: 7SIGNAL, INC., Independence, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,277

(22) Filed: May 22, 2023

(65) Prior Publication Data

US 2023/0300648 A1    Sep. 21, 2023

Related U.S. Application Data

(63) Continuation of application No. 17/752,698, filed on May 24, 2022, now Pat. No. 11,696,161, which is a
(Continued)

(51) Int. Cl.
*H04W 24/08* (2009.01)
*H04L 41/5009* (2022.01)
*H04L 41/5019* (2022.01)
*H04L 43/50* (2022.01)
*H04W 24/04* (2009.01)
*H04L 41/22* (2022.01)
*H04L 41/5067* (2022.01)
(Continued)

(52) U.S. Cl.
CPC ......... *H04W 24/08* (2013.01); *H04L 41/5009* (2013.01); *H04L 41/5019* (2013.01); *H04L 43/50* (2013.01); *H04W 24/04* (2013.01); *H04L 41/22* (2013.01); *H04L 41/5067* (2013.01); *H04L 67/306* (2013.01); *H04W 24/10* (2013.01)

(58) Field of Classification Search
CPC ............................ H04W 24/08; G01M 17/007
USPC ............................. 455/67.11; 370/352, 349
See application file for complete search history.

(56) References Cited

U.S. PATENT DOCUMENTS 5,481,588 A    1/1996    Rickli et al.
7,600,229 B1   10/2009   Shmuylovich et al.
(Continued)

*Primary Examiner* — Kiet M Doan
(74) *Attorney, Agent, or Firm* — Rauschenbach Patent Law Group, PLLC; Kurt Rauschenbach

(57) ABSTRACT

A distributed network performance management system and method that distributes a large portion of the network performance management to wireless client devices connected to the network. Rather than rely on a central server to perform the bulk of network performance management, a distributed network performance management system offloads much of the work of service quality testing, reporting, and troubleshooting to wireless client devices that are connected to the network. It utilizes spare computing power and storage space on the wireless client devices to reduce the cloud operation costs of the system including such things as bandwidth requirements, data storage requirements, and data processing requirements.

18 Claims, 30 Drawing Sheets

Related U.S. Application Data continuation of application No. 17/108,751, filed on Dec. 1, 2020, now Pat. No. 11,343,692, which is a continuation of application No. 16/908,477, filed on Jun. 22, 2020, now Pat. No. 10,939,312, which is a continuation-in-part of application No. 16/845,637, filed on Apr. 10, 2020, now abandoned, which is a continuation-in-part of application No. 16/748,241, filed on Jan. 21, 2020, now abandoned, which is a continuation-in-part of application No. 16/374,579, filed on Apr. 3, 2019, now Pat. No. 10,542,446, said application No. 16/845,637 is a continuation-in-part of application No. 15/600,681, filed on May 19, 2017, now Pat. No. 10,638,409, said application No. 15/161,177 is a continuation of application No. 15/161,172, filed on May 20, 2016, now Pat. No. 10,251,120, said application No. 16/374,579 is a continuation of application No. 15/161,177, filed on May 20, 2016, now Pat. No. 10,375,591.

(51) Int. Cl.
   *H04L 67/306* (2022.01)
   *H04W 24/10* (2009.01)

(56) References Cited

U.S. PATENT DOCUMENTS

| | | |
|---|---|---|
| 9,195,233 B2 | 11/2015 | Perrone |
| 9,300,520 B2 | 3/2016 | He et al. |
| 9,459,994 B2 | 10/2016 | Koneru et al. |
| 10,608,868 B2 | 3/2020 | Cheng et al. |
| 11,343,692 B2 | 5/2022 | Wangler et al. |
| 11,696,161 B2 | 7/2023 | Wangler et al. |
| 2007/0208442 A1 | 9/2007 | Perrone |
| 2011/0161912 A1 | 6/2011 | Etiminan et al. |
| 2012/0029947 A1 | 2/2012 | Wooldridge et al. |
| 2014/0237455 A1 | 8/2014 | Koneru et al. |
| 2018/0237027 A1* | 8/2018 | Lundsgaard ........ G01M 17/007 |
| 2021/0168634 A1 | 6/2021 | Wangler et al. |
| 2022/0036102 A1 | 2/2022 | Zhu et al. |

* cited by examiner

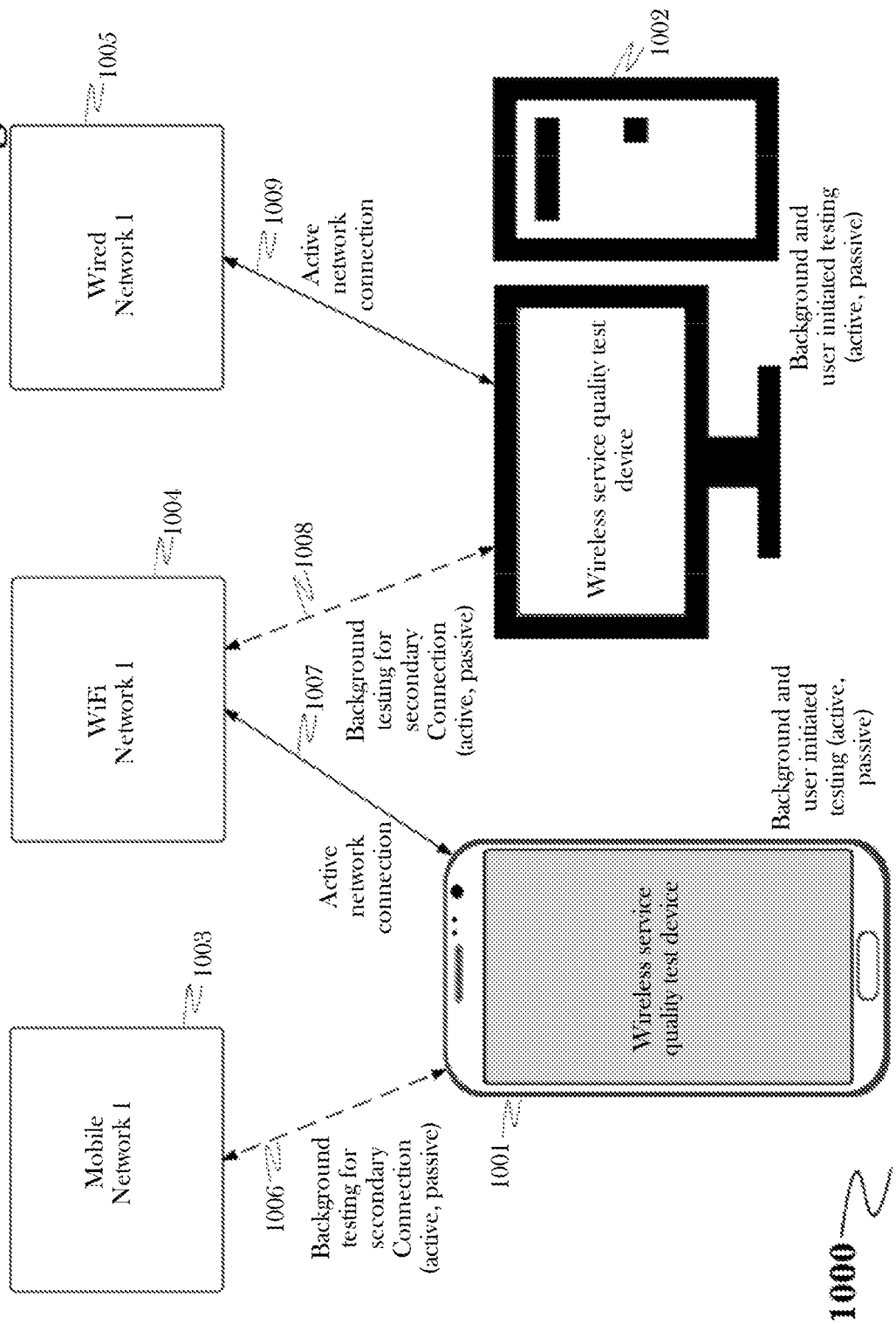

GPS: Provides coordinates, speed, altitude —1101

WiFi location: Location determined by proximity to known WiFi SSID/BSSID —1102

WiFi location service, RTLS or similar: Device location is defined by signal levels, propagation delay or signaldirection with directional antenna pattern —1103

Device location is defined by using magnetic location service calibrated for a building and floor plan —1104

User is offered a map/floorplan to point out location of the measurement point —1105

User is offered a dialog for entering location verbally. —1106

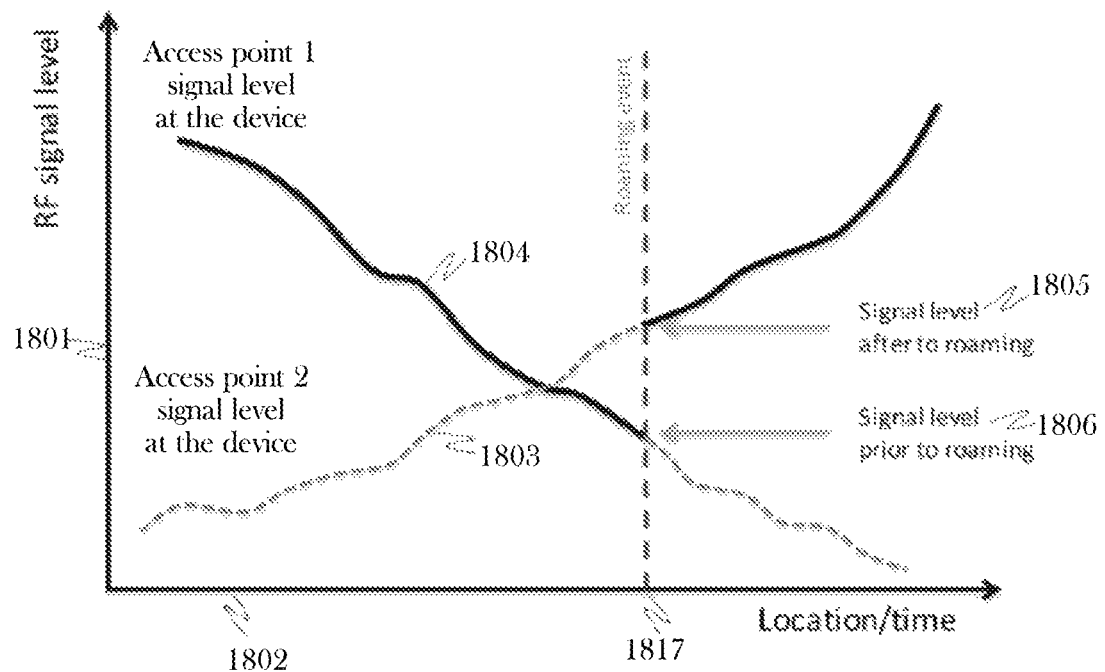
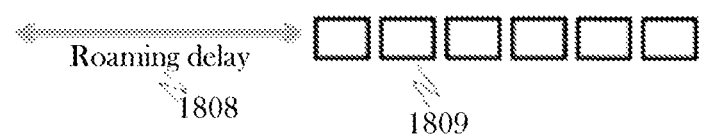
Fig. 18

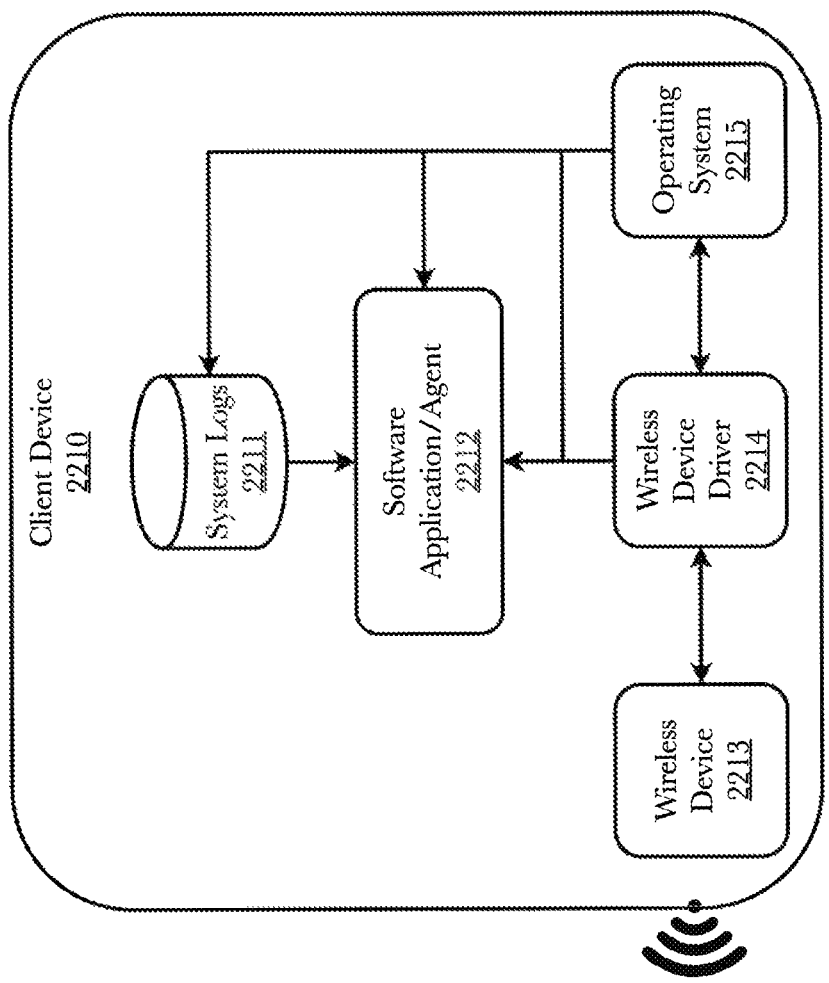
Fig. 22

SYSTEM AND METHOD FOR DISTRIBUTED NETWORK PERFORMANCE MANAGEMENT

CROSS-REFERENCE TO RELATED APPLICATION

The present application is a continuation of U.S. patent application Ser. No. 17/752,698 entitled "SYSTEM AND METHOD FOR DISTRIBUTED NETWORK PERFORMANCE MANAGEMENT", filed on May 24, 2022, which is a continuation of U.S. patent application Ser. No. 17/108,751, entitled "SYSTEM AND METHOD FOR DISTRIBUTED NETWORK PERFORMANCE MANAGEMENT", filed on Dec. 1, 2020, issued on May 24, 2022 as U.S. Pat. No. 11,343,692, which is a continuation of U.S. patent application Ser. No. 16/908,477, entitled "SYSTEM AND METHOD FOR DISTRIBUTED NETWORK PERFORMANCE MANAGEMENT", filed on Jun. 22, 2020, issued on Mar. 2, 2021 as U.S. Pat. No. 10,939,312, which is a continuation-in-part of U.S. patent application Ser. No. 16/845,637, entitled "SYSTEM AND METHOD FOR WIRELESS NETWORK PERFORMANCE MEASUREMENT AND MANAGEMENT USING REMOTE DEVICES", filed on Apr. 10, 2020, which is a continuation-in-part of U.S. patent application Ser. No. 16/748,241, entitled "SYSTEM AND METHOD FOR WIRELESS NETWORK PERFORMANCE MEASUREMENT AND MANAGEMENT USING REMOTE DEVICES", filed on Jan. 21, 2020, which is a continuation-in-Part of U.S. patent application Ser. No. 16/374,579, entitled "SYSTEM AND METHOD FOR WIRELESS NETWORK PERFORMANCE MEASUREMENT AND MANAGEMENT USING REMOTE DEVICES", filed on Apr. 3, 2019, issued on Jan. 21, 2020 as U.S. Pat. No. 10,542,446, which is a continuation of U.S. Non-Provisional application Ser. No. 15/161,177, entitled "SYSTEM AND METHOD FOR WIRELESS NETWORK PERFORMANCE MEASUREMENT AND MANAGEMENT USING REMOTE DEVICES", filed on May 20, 2016, issued on Aug. 6, 2019 as U.S. Pat. No. 10,375,591, which is a continuation of U.S. patent application Ser. No. 15/161,172, entitled "SYSTEM AND METHOD FOR WIRELESS NETWORK PERFORMANCE MEASUREMENT AND MANAGEMENT USING REMOTE DEVICES" filed on May 20, 2016, issued on Apr. 2, 2019 as U.S. Pat. No. 10,251,120, and the U.S. patent application Ser. No. 16/845,637 is a continuation-in-part of Ser. No. 15/600,681, entitled "WI-FI ROAMING MANAGEMENT", filed on May 19, 2017, issued on Apr. 28, 2020 as U.S. Pat. No. 10,638,409. The entire contents of U.S. patent application Ser. Nos. 17/752,698, 17/108,751, 16/908,477 16/845,637, 16/748,241, 16/374,579, 15/161,177, 16/845,637 and 15/600,681 are herein incorporated by reference.

BACKGROUND OF THE INVENTION

Field of the Art

The disclosure relates to the field of wireless networks, and more particularly to the field of wireless network service quality measurement and management.

Discussion of the State of the Art

Wireless networks have become a foundational part of our communications technology. Current methodologies for network performance management are substantially limited in numerous ways, including, but not limited to, their ability to obtain accurate data regarding network performance at all levels, their ability to integrate those data to determine and optimize overall network performance, and their ability to identify, troubleshoot, and improve areas of poor network performance. Current methodologies further rely on testing and data gathering performed by a central server, which leads to bandwidth problems and unnecessary data storage and processing costs.

What is needed is a distributed network performance management system and method that distributes a large portion of the network performance management to wireless client devices connected to the network.

SUMMARY OF THE INVENTION

Accordingly, the inventor has conceived and reduced to practice, a distributed network performance management system and method that distributes a large portion of the network performance management to wireless client devices connected to the network. Rather than rely on a central server to perform the bulk of network performance management, a distributed network performance management system offloads much of the work of service quality testing, reporting, and troubleshooting to wireless client devices that are connected to the network. It utilizes spare computing power and storage space on the wireless client devices to reduce the cloud operation costs of the system including such things as bandwidth requirements, data storage requirements, and data processing requirements. In some embodiments, all or some of the locus of control of network performance management may be shifted up or down the hierarchy of system components as needed. In some embodiments, the system employs client service levels and optimization algorithms to dynamically adjust the level of sampling detail gathered in response to certain network conditions. In some embodiments, the system uses multi-factor event correlation to infer network conditions that are not directly measurable or identifiable. In some embodiments, the system uses improved wireless client device system driver data capture and analysis to obtain accurate measurements of device-specific network performance, even where such device-specific network performance are not supported by the client device or the wireless access point to which the client device is connected.

According to a preferred embodiment, a system for distributed network performance management is disclosed, comprising: a control server, comprising a memory, a processor, and a first plurality of programming instructions stored in the memory which, when operating on the processor, cause the control server to: send configuration instructions to a distributed testing application installed on a plurality of client devices, the configuration instructions for each device comprising: a level of autonomy of the client device; instructions to report network test results, the network test results comprising an indicator of network performance regarding the client device's connection to a network; receive the reported network test results from the client device; and determine a condition of performance of the network from the reported data; change the configuration instructions for one or more of the plurality of client devices based on the condition; and a distributed testing application comprising a second plurality of programming instructions stored in a memory of, and operating on a processor of, each of the plurality of client devices, wherein the second plurality of programming instructions, when operating on the processor of the respective client device, causes the respective client device to: receive the configuration instructions; establish a network testing regime, the network testing regime being based on the level of autonomy and comprising: a selection of one or more types of network testing to be performed; a schedule for performing the one or more types of network testing; and a selection of one or more granularity levels for the one or more types of network testing; and a selection or one or more granularity levels of test results to report; a schedule for reporting network test results of the one or more types of network testing and granularities to the control server and/or a third party server; and report the network test results to the control server or the third party server.

According to another preferred embodiment, a method for distributed network performance management is disclosed, comprising the steps of: sending configuration instructions from a control server to a distributed testing application installed on a plurality of client devices, the configuration instructions for each device comprising: a level of autonomy of the client device; instructions to report network test results, the network test results comprising an indicator of network performance regarding the client device's connection to a network; receive the reported network test results from the client device; and determining a condition of performance of the network from the reported data; changing the configuration instructions for one or more of the plurality of client devices based on the condition; and wherein the distributed testing application, operating on each of the plurality of client devices, causes the respective client device to: receive the configuration instructions; establish a network testing regime, the network testing regime being based on the level of autonomy and comprising: a selection of one or more types of network testing to be performed; a schedule for performing the one or more types of network testing; and a selection of one or more granularity levels for the one or more types of network testing; and a schedule for reporting network test results of the one or more types of network testing to the control server or a third party server; and report the network test results to the control server or the third party server.

According to an aspect of an embodiment, a hierarchy of client devices is used wherein some of the plurality of client devices act as an intermediary control server for other client devices.

According to an aspect of an embodiment, a service level manager is used to: include a service level command in the configuration instructions sent to one or more groups of client devices, the service level command comprising a service level for testing and reporting; wherein the service level command causes each client device a given group to adjust its network testing regime based on the service level.

According to an aspect of an embodiment, the selection of tests, the schedule for testing, and the schedule for reporting of the network testing regime for each device in the given group is based on statistical sampling methodologies.

According to an aspect of an embodiment, the network testing regime further comprises: monitoring of a parameter of network performance; increasing network testing frequency, granularity, or both, where the client device detects a problem with network performance; and decreasing network testing frequency, granularity, or both, where the client device does not detect a problem with network performance.

According to an aspect of an embodiment, the configuration instructions further comprise instructions to capture geolocation data regarding the client device's geolocation and provide the geolocation data in conjunction with the network test results.

According to an aspect of an embodiment, the configuration instructions further comprise instructions to additionally send test results to a third-party server for analysis and reporting.

According to an aspect of an embodiment, the configuration instructions further comprise instructions to only send detailed test results to a third party while sending only the results at the level of detail required by the control server to manage the statistical sampling and testing regimes.

According to an aspect of an embodiment, at least one client device is a wireless device, and at least one of the one or more types of network testing is a test of wireless communication performance.

According to an aspect of an embodiment, a distributed testing application is used to: capture wireless packet data from the wireless device driver of the client device; extract frame data from the wireless packet data; and calculate an indicator of wireless performance from the extracted frame data.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 10 is a diagram illustrating both passive and active testing of more than one wireless network by wireless network service quality test devices according to a preferred embodiment of the invention.

FIG. 11 Is a list of methods by which the location of individual wireless network service quality test devices may be obtained according to a preferred embodiment of the invention.

FIG. 18 is a diagram illustrating change of access point during wireless network user roaming according to an embodiment of the invention.

FIG. 22 is a diagram showing an exemplary architecture for capture of connectivity and accurate network performance data on client devices, even where the client device does not support such capture.

DETAILED DESCRIPTION

Figure 1:
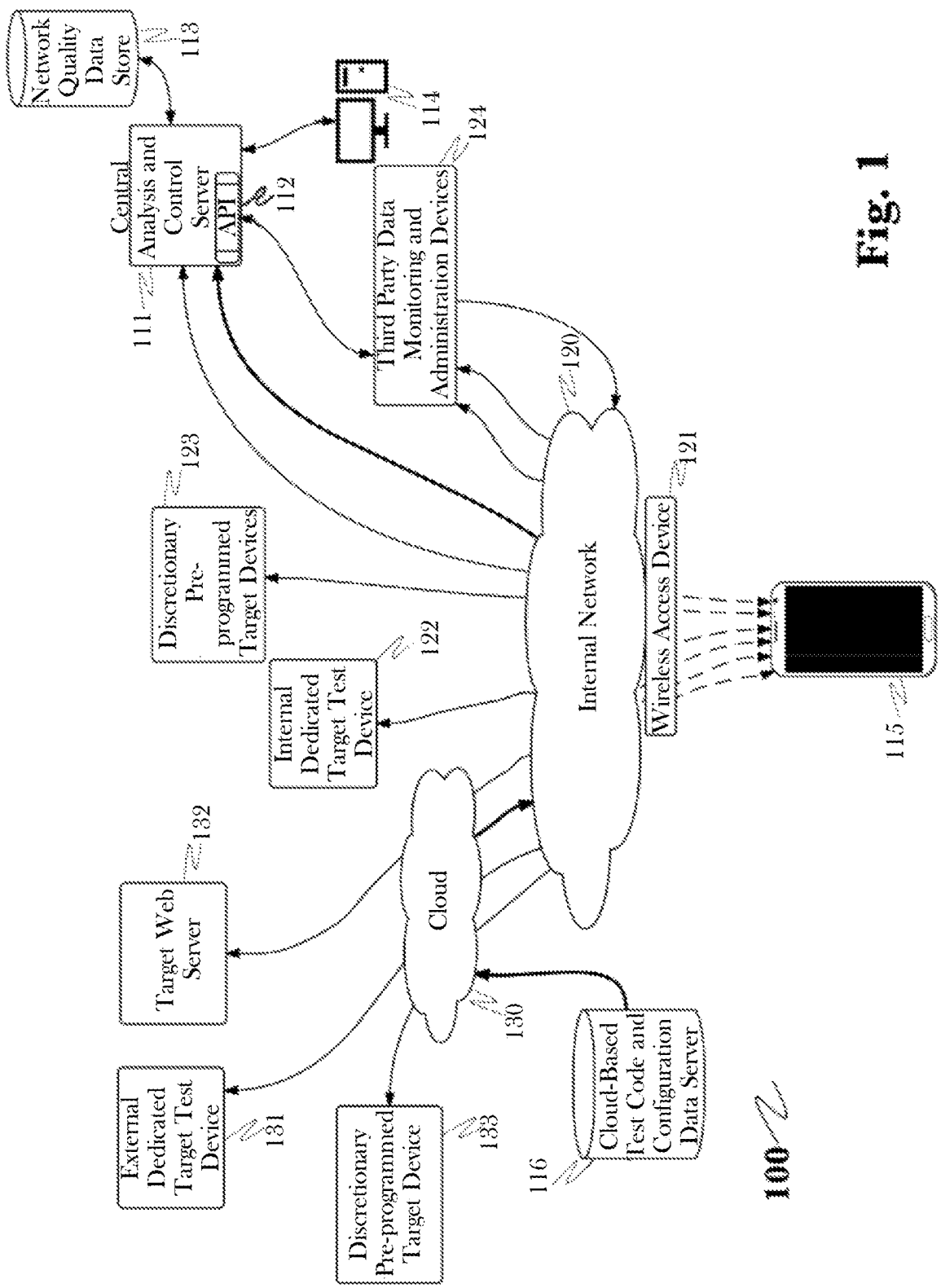
FIG. 1 is a block diagram illustrating an exemplary system architecture for measuring and reporting wireless network service quality using remote devices, according to a preferred embodiment of the invention.

The inventor has conceived and reduced to practice, a distributed network performance management system and method that distributes a large portion of the network performance management to wireless client devices connected to the network. Rather than rely on a central server to perform the bulk of network performance analysis, a distributed network performance management system offloads much of the work of service quality testing, reporting, and troubleshooting to wireless client devices that are connected to the network. It utilizes spare computing power and storage space on the wireless client devices to reduce the cloud operation costs of the system including such things as bandwidth requirements, data storage requirements, and data processing requirements. In some embodiments, all or some of the locus of control of network performance management may be shifted up or down the hierarchy of system components as needed. In some embodiments, the system employs client service levels and optimization algorithms to dynamically adjust the level of sampling detail gathered in response to certain network conditions. In some embodiments, the system uses multi-factor event correlation to infer network conditions that are not directly measurable or identifiable. In some embodiments, the system uses improved wireless client device system driver data capture and analysis to obtain accurate measurements of device-specific network performance, even where such device-specific network performance are not supported by the client device or the wireless access point to which the client device is connected.

Network connected mobile devices such as smart phones and tablets may be used in conjunction with a central data analysis and test control server to measure multiple parameters that reflect wireless network service quality and performance. Each participating mobile device downloads and installs a test suite application. The test suite application contacts the central data analysis and test control server and identifies the mobile device. The central server responds with the coding and configuration for tests to be run. These tests may include wireless signal strength, wireless current channel, wireless frequency band, data throughput, network capacity currently in use, radio attachment latency and success, ping latency, remote resource access latency and remote resource download bandwidth among many other parameters possible. Test parameters define details of the tests, including networks to be tested and target servers to be used in the test. Test parameters also determine whether tests are run on-server's-request, periodically, continuously or initiated by user only. Tests performed by the test suite may be chosen to reflect the needs and purpose of individual clients or test campaign at the central data analysis and test control server and then pushed to the remote devices just prior to the start of testing. The identification code allows customizing a standard device or a group of standard devices with a generally available software for the purpose of the customized test. The identification code is also submitted with the test data points and allows storing and analyzing the data centrally for a group of devices which belong to certain organization.

In some embodiments, the wireless network service quality test system may be configured to receive information from third parties. In some embodiments, receipt of third party information may be facilitated through an application programming interface ("API"). This data may include data from devices such as wireless access points to receive information that may include the manufacturer and model of the access point, map of the area, access point location in the map, global positioning system ("GPS") coordinates of the access points, location of certain devices at certain times as positioned by the network, current attached clients, current error logs, and current firmware and software level, among other information. This information may be used to better complete the network quality dataset both during routine testing and in case troubleshooting analytics are needed.

In some embodiments, the system may be configured to send information such as warnings, alarms and wireless network performance data to on-device logs (e.g., system logs, application logs, etc.), external services such as logging services, log aggregators, ticketing services, etc., or to other devices. These data or messages may be routine, or informative or may signify that service level of a particular aspect or aspects of a monitored wireless network has dropped below a pre-designated minimal level required by the customer. Alternatively, the system may be configured to provide all raw measurement data to other applications for further processing. Analytics capability of the wireless network service quality test system may also be used to predict the root cause of the service reduction and suggest possible remedial action, if desired.

Finally, in some embodiments, data collected by the client devices may be represented and displayed to best suit the customer's needs. In some embodiments, one or more selected network performance parameters may be displayed graphically over a pre-selected time period as a percentage of known performance target level of the tested network, possibly also depicting pre-decided minimal network performance. In other embodiments, a color-coded topographical type map may be displayed of the coverage area of the tested network showing performance, signal levels, or network throughput as differing colors as a function of location. In other embodiments, the system may display adherence to pre-determined performance levels with colored cells on a map or floor plan. This would make use of location reporting functions of the test devices, possibly GPS based, data from online map providers, or location data gleaned from the wireless access points or other data such as propagation time and comparative target signal strength of the test device. Location may also be entered by user of the device by pointing out a location on a map or floor plan. Many other representations are possible, dependent on the needs and goals of the customer. Data may be encoded in such a way so as to be used by another electronic system such as a third party network manager.

In some embodiments, mobile devices may be part of a group of mobile devices, for example mobiles devices of a particular company, and may be identified as such. Mobile devices that are part of a group may be assigned service levels and/or may be configured with test parameters and configurations for a particular network or networks.

In some embodiments, the system disclosed herein may be used to infer the modulation and coding scheme index (MCS index) for a given wireless connection. Each MCS index represents a set of frequency, streams, modulation, and coding that establish the maximum data rate/bandwidth that can be achieved using that index. However, despite the important of the MCS index in wireless communications, some current operating systems don't report it, and it can't be effectively inferred by existing methodologies for determining wireless performance. When two wireless devices connect with each other, they negotiate to determine what setting to use in what is called a "handshake." A handshake involves sending parameters back and forth between the wireless devices to determine the parameters under which they can communicate with one another. These parameters are codified into sets in the MCS index. By collecting data regarding data rates, error rates, and other parameters from the wireless data packets exchanged between the wireless devices, an MCS index can be inferred. Existing methodologies for determining wireless performance are too inaccurate to allow an MCS index to be calculated, but by intercepting the wireless data packets during or just after transmission, accuracy improved to the point where an MCS index can be inferred.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions "Access point" as used herein means any device capable of receiving and re-transmitting wireless signals from client devices.

"Client" as used herein means any software or hardware that accesses computing functionality made available by a server.

"Client device" as used herein means any computing device that accesses functionality made available by a server. The term client device often, but not exclusively, refers to a computing device that accesses a computing service made available by a server via a network. Many computing devices are capable of being both client devices and servers. Client devices may be either wired, wireless, or both.

"Network" as used herein means two or more computing devices configured to communicate with one another. Non-limiting examples of networks are local area networks (LANs), wide area networks (WANs), wireless networks, and virtual private networks (VPNs).

"Server" as used herein means any software or hardware that offers computing functionality for use by clients. Such functionality is often called a "service," and non-limiting examples of such functionality are sharing of files and storage, making computations and returning results, distributing computations among multiple processes or devices, and transferring data.

"Wireless network" as used herein means two or more computing devices configured to communicate with one another, wherein at least one of the communications in the network is performed wirelessly. Non-limiting examples of wireless communication are WiFi, Bluetooth, and cellular communications.

Conceptual Architecture

FIG. 1 is a block diagram illustrating an exemplary system architecture 100 for measuring and reporting wireless network service quality using remote test devices 115, according to a preferred embodiment of the invention. Under the embodiment, data concerning factors that affect the service quality levels of a wireless network of interest 120 which may include but are not limited to steady state signal strength, variability in signal strength, signal to noise ratio, packet retry rate, used data rate, current percentage of network traffic versus network capacity, radio attachment latency and success rate, resource request latency, web page load time and success rate, access to certain applications over network connection, voice quality, video quality, packet loss, jitter, location of the test device, and ping response time, among others known to those skilled in the art, are collected by wireless network connected remote test device 115 which most often will be an end-user's mobile device such as a smart phone or tablet running a pre-programmed network test framework application. Remote network test device 115, may also, under some circumstances, be a desktop workstation, a laptop computer, a kiosk, an Internet of Things (IoT) device, a wireless access point, modems with wireless ("Wi-Fi") or optical ("Li-Fi") capability such as asynchronous digital subscriber line ("ADSL") or cable modems, or dedicated sensor devices for this purpose. Other test device possibilities exist; those put forth here are meant only as selected examples. A plurality of remote network test devices 115 may be used in each network service quality test.

While simple spot tests of a network are possible using only the remote network test device with the un-programmed network test framework application, the data collected in this fashion is not associated with data collected from concurrent testing run by other mobile devices and the data are not stored in such a way as to be later used to diagnose network issues or render time based status results of a network. To run continuous or recurring ongoing tests that may be used in further analysis and conclusion generation, the client must have an account which holds, among other information the specific network tests to run, the duration of the data collection for each test, where appropriate, the periodicity at which each test should be run, the number of recurrences for each test, the transformations to be run on each returned data set and potentially, the manner in which results are to be presented, to name a few examples of parameters that may comprise a test from the many known within the field. In this embodiment all of these parameters, with the programming functions to execute the desired network evaluation are stored in a cloud-based test code and configuration server 116 and, prior to testing, information, including a unique test suite ID, is transferred to a site's central analysis and control server 111 from which remote network test devices 115 to be used are programmed and configured. All data collected as part of the test suite will have the unique test suite ID when sent to central analysis and control server 111 and may be stored in a data store 113 long-term as such including the unique ID for retrieval and future transformation by central analysis and control server 111. Central analysis and control server 111 also provides an API 112 that allows it to share output from test analysis to third party network equipment 124 such as a network management server, to name one of a plurality of examples, and to retrieve important information from wireless network equipment such as maps with access point locations, wireless network firmware and software versions, network configuration information, traffic volume and quality parameters from network equipment, wireless access point 121 parameters where such data as wireless standards being supported (examples: b, g, a, n, ac), security protocols enforced (examples: WPA, WPA2, WPA Enterprise), access point RF radio transmitted signal strength, broadcast bands enabled (examples: 2.4 GHz, 5 GHz), collisions, retransmissions and percent capacity in use, to list a few members of a larger set of attributes, may be important to diagnosing wireless network service quality issues, proposing remedies, and sending notifications, capabilities for which the analytics engine of central analysis and control server 111 is programmed should network service levels fall below customer service level expectations.

Based upon programming and test system setup, the remote network test devices may attempt to connect to and download or upload resources to company internal dedicated target test devices 122. These devices may be connected to the same networked by cable or connected wirelessly. They may also be connected to another segment or network within the company to allow testing of a wider range of infrastructure components. There may also be other devices present on a company's network infrastructure that are critical to operations that are therefore tested 123. An example may be wired or wirelessly connected printers that the company uses which, if not available for jobs, may cause process delays or work stoppages; some may print manufacturing orders, others invoices and still others general duty jobs. Another example may be wirelessly connected or wired scanners. Service requirements for these resources are expected to be high and action in event of significant reduction or loss of function needed swiftly. Similarly, remote devices performing test may be programmed to automatically log in to certain applications like warehouse control systems or sales management systems to test availability of access to them and possibly perform a test query to record overall service availability and response times. Measurement of service to external cloud 130 resources 131, 132, 133 is equally important and testing connectivity and resource availability from external dedicated targets 131, discretionary targets 133, perhaps a government printer or software as service systems that the company might use. The ability to reach a wide number of high volume web server web pages 132, for example FACEBOOK™, SKYPE™, CHROME™ and GOOGLE™ to list a few known to those skilled in the art, as well as customer critical web server web pages is also a good indicator of wireless network service health as it relates to traversing firewalls and gateways, and the health of web servers of specific concern to the customer, if included.

Devices accessing network use several services which control access to resources and provide basic connectivity information. DHCP services allocate IP addresses to devices connecting to network. Authentication and authorization services like Radius provide a wide variety of protocols for authenticating the users prior to allowing access to resources. DNS services allowing use of URLs instead of numeric IP addresses. Device with the test suite use and tests these services and report qualities like success rates, delays and errors with the services. This information is stored and analyzed for further actions.

Devices programmed for test may perform measurements in the background measuring signal levels, data rates, retry rates and throughputs at different times. While the device moves, signal levels vary or when instructed by network, device may change connection to another access point as illustrated in FIG. 18. Assessing characteristics of the roaming behavior can be done be measuring signal level, signal to noise ratio, used data rate, throughput, packet loss and other parameters before and after the roaming event 1800. Measuring the time gap between the last data packet from previous access point and the first packet from the new access point provides information on the packet flow interruptions, which are especially important for real time traffic like voice. Collecting this information allows comparing behavior of different device manufacturers, device models, software versions, access points and different network settings and optimizing the service for best user experience.

Resolving certain issues may require more detailed information than the normal test suite can provide. Central analysis and control server may initiate a more detailed test procedure to selected devices. This may include observing and measuring terminal behavior continuously, collecting logs from the terminal, collecting logs triggered by failure to meet predetermined service parameters, entering a special test mode or root/jail break mode which provides more information or recording the device display views at the time of the issue. Central control and analysis server may also be used to ask user to perform certain task through one or more administrative computers 114.

Test controls define when tests are performed. Test controls include a list of networks which are to be tested. In the absence of an included network, no active test will be attempted. This allows collection of data only from networks of interest, minimized terminal battery consumption and bandwidth consumption if network is metered.

The system also has capability to accept and analyze user experience concerning wireless network service quality during testing 115. Either as a matter of normal test suite function or due to the return of test results showing borderline or deficient service quality levels, users may be asked to comment either being given multiple preprogrammed answers from which to choose or through freeform written response which is interpreted by the central analysis and control server 111. Extra data provided by receiving user experience feedback provides a more complete picture of impact of lower service levels on actual user experience.

It should be noted that placement components of the invention in this embodiment were made for explanatory reasons. Some components, for example the central analysis and control server, could reside elsewhere without changing its function. The central analysis and control server would function similarly as a corporation local device or as a cloud device, possibly a software as a service appliance subscribed to by the client corporation.

Figure 20:
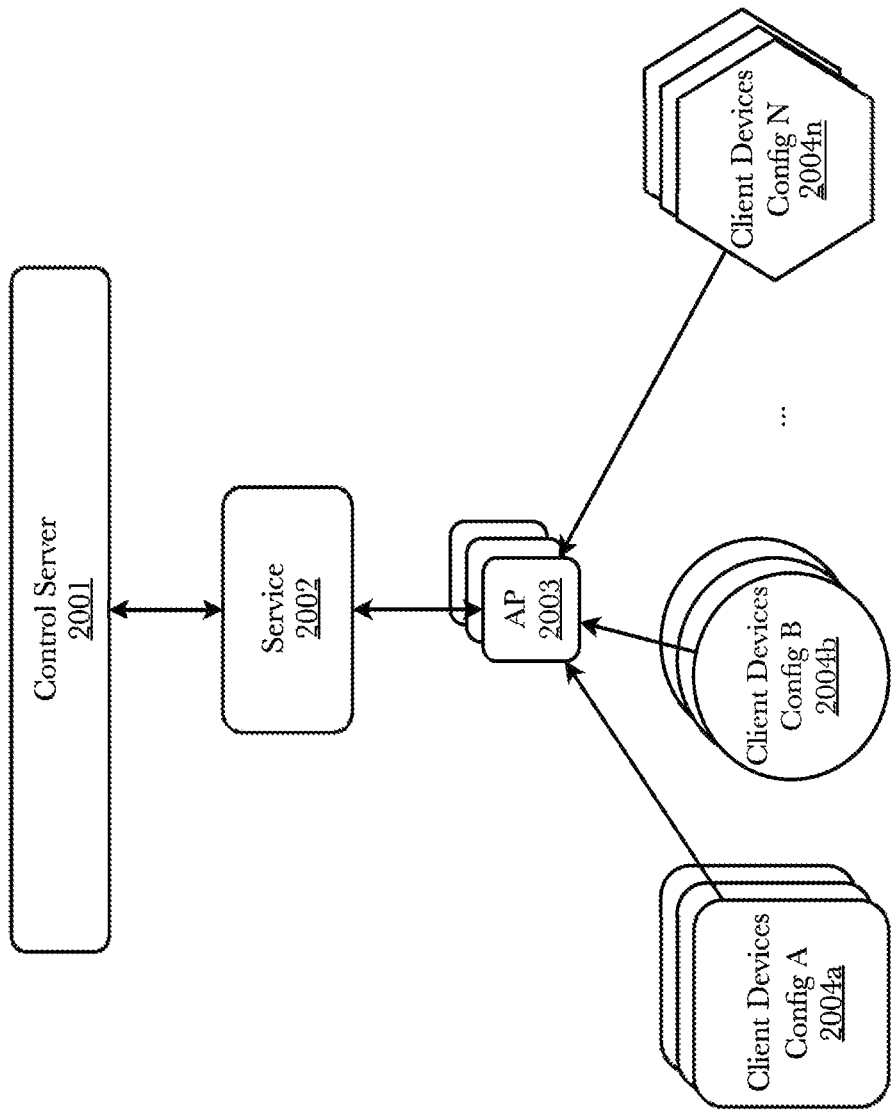
FIG. 20 is a diagram showing an exemplary system architecture for a distributed network performance management system.

FIG. 20 is a diagram showing an exemplary system architecture for a distributed network performance management system. The distributed network performance management system is a smart, flexible wireless network monitoring solution that can operate independently, as part of a pre-existing ecosystem, or as part of a centralized, single-purpose service. Because of its distributed nature, computing and storage resources can be allocated to any level of the system, from the control server 2001 to the client devices 2004*a-n* based on network conditions (e.g., outages of sub-servers and services 2002, access points 2003, and connections/disconnections of client devices 2004*a-n*, etc.) and availability of online resources (e.g., bandwidth, storage capacity, processing capacity, etc.). The system may include dedicated client devices 2004*a-n* to play expanded roles not appropriate for client devices whose primary role is not network monitoring and management. Computing and storage resources can be dynamically re-allocated during operation, shifting them up and down between the control server 2001, services 2002, and client devices 2004*a-n*, as network conditions change. Thus, the locus of control of the system and the location of processing and analysis may be shifted up or down the hierarchy of system components as needed. This may be done by causing the control server to issue a set of configuration instructions comprising a level of autonomy authorized for each client device. The level of autonomy may range from minimal (e.g., reporting and testing based on a tests pre-selected in the configuration instructions and schedules pre-defined in the configuration instructions) to maximal (e.g., wherein the client device itself determines, based on an application running on the device, what tests to select and perform, when to perform the tests, what test result data to store, whether and how often to report to the control server, and how to dynamically change the frequency (i.e., periodicity of testing) and granularity (i.e. level of detail captured during testing) of testing based on changing network conditions). Upon receipt of the configuration instructions, each client device will establish a network testing regime consistent with the level of authority set forth in the configuration instructions. In some configurations, the configuration instructions may include instructions for a given client device to act as an intermediary control server for a group of client devices, wherein that client device issues configuration instructions to the group in a manner similar to the control server, and the group reports back to that client device (acting as an intermediary control server). The client device acting as an intermediary control server will, as part of its network testing regime, determine whether and how often to report its group's data back to the control server, based on its level of autonomy.

In some embodiments, analytic and control functions may be shifted to certain layers or levels of the hierarchy. For example, keeping track of the number of clients which should provide sample data for an access point may be managed by a computing device at any level (i.e., by one of the client devices in a group using a certain access point, a computing device that aggregates data from several access points, or a more centralized server that oversees many access points), and that tracking function may be shifted up, down, or laterally, depending on the requirements of the system. For example, if the computing device assigned to perform the tracking is experiencing connectivity problems, the responsibility for that tracking may be shifted up the hierarchy to a device not so affected. Conversely, it may be the case that a more centralized component does not have sufficient computing capacity to analyze all of the network data that it is receiving, and may distribute the analysis of that data to lower levels of the hierarchy. In this embodiment, the system comprises a control server 2001, a service 2002 such as a mobile phone service, an online cloud computing platform, a VM or hardware device running an application or intra-company network controller, a plurality of wireless access points 2003, and a plurality of client devices 2004*a-n*, which may have different configurations.

In some embodiments, the access points 2003 are not part of the system as, for example, when the service 2002 is an online platform which can be accessed from any location through public or third-party access points 2003.

Regarding the frequency and granularity of testing, in some cases, the frequency of testing (i.e., the periodicity of testing, or time between tests) may need to stay constant to identify a problem quickly while the granularity of the captured results (i.e., the level of detail investigated and/or captured during testing) may vary dramatically to avoid waste (e.g., scan data results). In other cases, frequency may need to be reduced and granularity may be held constant (e.g. testing of throughput results). In some cases, both frequency and granularity of testing may be adjusted or held constant.

The control server 2001 is responsible for oversight of the system and decision-making, such as allocation of computing resources and storage, monitoring and reporting overall network status, assigning testing tasks to client devices, and receiving, storing, and analyzing network performance data from client devices. However, because the system is distributed by design, many of these tasks can be shifted to the client devices 2004*a-n*, utilizing spare computing resources and storage on the client devices 2004*a-n*, such as idle processor time or a configurable percentage of available storage space. For example, the control server 2001 may configure client devices via remote instruction regarding which tests to run, how frequently such tests should be run, and thresholds for testing and reporting, and schedules and other conditions for reporting data. The application on the client devices 2004*a-n* may then run in the background, independently conducting system testing as configured by the control server 2001, analyzing results, storing test results locally, and reporting them as scheduled. In this case, the client devices 2004*a-n* act as independent agents, gathering, analyzing, storing, and reporting data. Alternately, the control server 2001 may take a more active role, directly instructing client devices 2004*a-n* to run certain tests and report the results, with the control server 2001 storing the data and conducting the analyses. In this case, the client devices 2004*a-n* are used more like sensors that simply report back their data to the control server 2001. A wide range of such allocations is possible, which gives the system tremendous flexibility in responding to changing network conditions.

The service 2002 may be any type of service, platform, system, or device that allows access by one or more client devices 2004*a-n* through one or more access points. For example, the service 2002 may be a mobile phone service whose access points are cellular towers, an online cloud computing platform accessible via any access point that provides access to the Internet, a cloud-based virtual private network (VPN) networking system with access points owned by the cloud-based VPN or the client (e.g., a cloud-based VPN connecting a company with multiple regional offices, each of which has its own local access points), or a local network controller device with access points (e.g., a single office company with a network controller and a plurality of access points). Access points 2003 are any devices capable of receiving and re-transmitting wireless signals from client devices 2004*a-n*. Typically, these will be dedicated devices such as wireless routers and cellular towers, but may by client devices 2004*a-n*, which can be configured to act as access points 2003. The client devices 2004*a-n* are any devices capable of wireless communication. They may be of multiple different types (e.g., mobile phones, desktop computers, tablet computers, internet of things devices, etc.) and there may be multiple instances of each type of device in any given configuration on a network. Unlike access points 2003, client devices will typically have general-purpose computing capabilities, which can be configured to perform network testing activities and report results back to the control server 2001, using, for example, a software application installed on the client device that can be configured or controlled by the control server 2001. However, some client devices, such as Internet of Things (IoT) devices may have more limited capabilities and yet can still be used as client devices 2004a-n.

It is important to note that a "network" is used to denote any grouping of client devices 2004a-n that access a common service 2002. For example, it can be used to denote a local group of commonly-owned access points, client devices, and associated hardware (for example, a WiFi network in the headquarters building of a company) or can be used in a broader sense to denote a group of individually-owned client devices having a subscription to an online platform and accessing the online platform through a combination of privately-owned and publicly-accessible access points or a group of computing devices connected through a virtual private network (VPN). For the sake of clarity, only a single service 2002 is shown in the diagram, representing one "network" of client devices. However, the control server (or multiple control servers) may manage any number of such networks for any number of companies or groups.

In some embodiments, the client devices 2004a-n may be configured to use an open API, enabling use of the client devices 2004a-n with different types of, or multiple operators of, control servers 2001. In other words, the client devices 2004a-n could be configured to provide network performance testing and data to multiple different control servers 2001 which may have different owners or operators. For example, the application installed on a client devices 2004a-n could run tests for, and provide data to, an operator of one network when certain access points are accessed and run tests for, and provide data to, an operator of a different network when other access points are used. Many different configurations are possible, allowing the client devices 2004a-n to be used as a roaming network performance testing unit and data provider, which may be a service subscribed to by operators.

The control server 2001 may assign different operational modes to different client devices depending on network conditions or the types of testing desired. For example, the control server may dynamically assign active or passive test execution to client devices based on any network condition or type of testing desired, for example: desired voice, video, or throughput test coverage per access point, per network per client type (e.g. Windows vs Mac), or per client configuration/capability, or server connectivity and latency per server by ping or web downloads, etc. Further, the control server 2001 may base configurations or operating modes of client devices on statistical sampling methods to ensure representative sampling large enough to achieve statistical significance across the client device 2004a-n, access points 2003, and network population while minimizing the active test processing load on the network and client device 2004a-n components. The testing configurations and operational modes assigned by the control server 2001 may be further organized by population groups (e.g. a particular customer organization) to optimize the network performance management for the client device 2004a-n type mix (e.g., high/low bandwidth connections, high/low spare processing power, frequently connected/disconnected, etc.) enabling optimal client device and network coverage while minimizing the number of connected clients devices needed to achieve representative network performance data. The testing configurations and operational modes assigned by the control server 2001 may be further organized by error rate thresholds by test type, physical (street) location, access point groupings at a particular location, client device capabilities, network type, and other network conditions.

Depending on the system configuration, the control server 2001 or other system components may provide reporting of network conditions to administrators through a variety of means, including, but not limited to email, webhook, SMS, push-enabled communication services, or other publishing mechanisms supported by the network (e.g., REST calls). This does not exclude, of course, obtaining certain reported data through other means, such as phone calls by a customer to a help desk to report a network performance problem.

Figure 21:
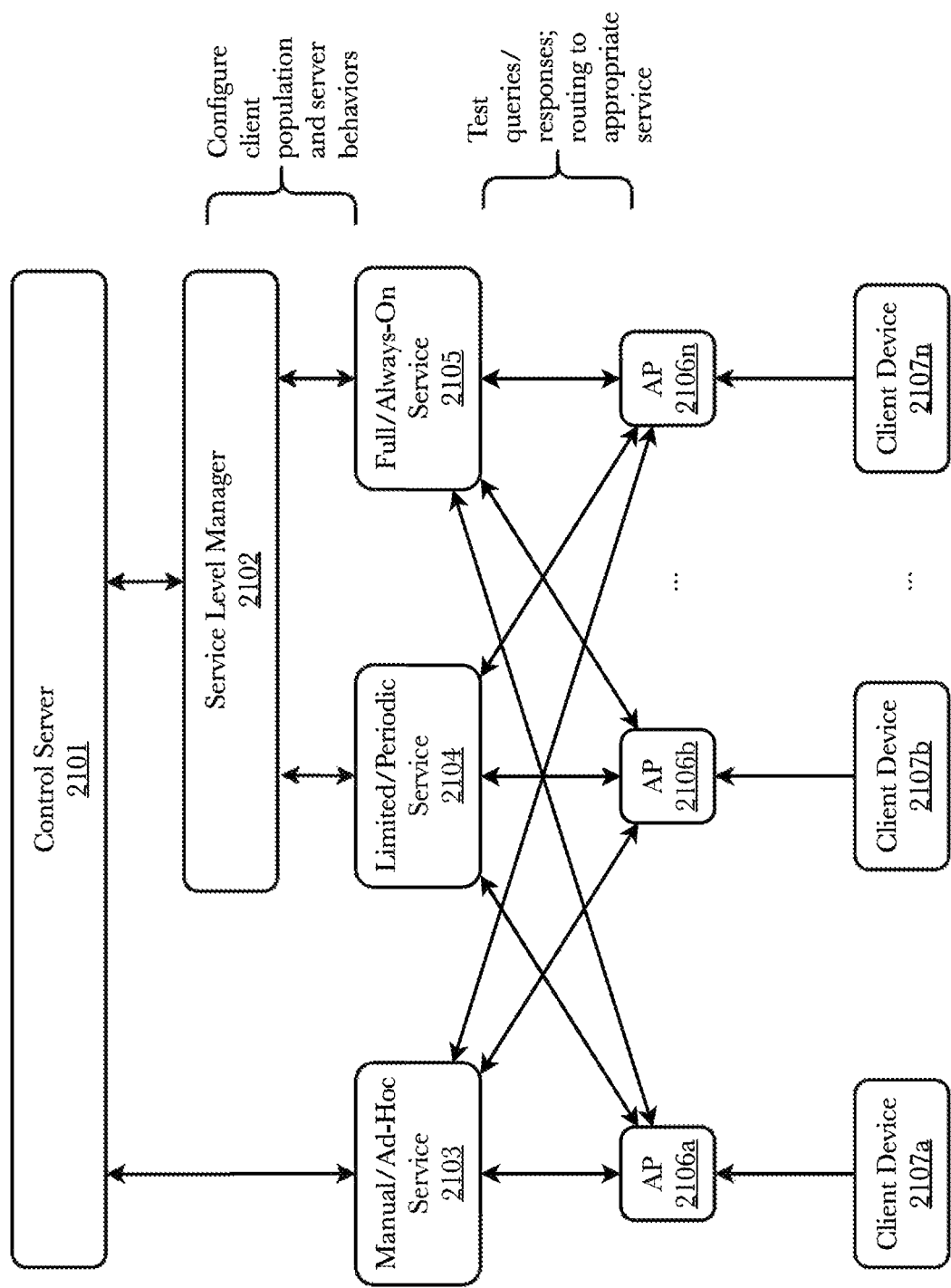
FIG. 21 is a diagram showing an exemplary system architecture distributed network performance management system which uses services levels to control the volume and flow of network testing traffic.

FIG. 21 is a diagram showing an exemplary system architecture distributed network performance management system which uses services levels to control the volume and flow of network testing traffic. In this embodiment, the control server 2101, access points 2106a-n, and client devices 2107a-n operate in a manner similar to that described above. However, service levels are added to the system to differentiate and control the volume of network performance testing traffic and to help ensure statistically valid sampling of larger networks. In this case, a service level manager 2102 may be added in between the control server and access points to manage the level of service provided to certain groups of client devices (e.g., the company-owned mobile devices in a given company). The service level manager 2102 can take some of the load from the control server 2101 in terms of configuring client devices and their operating modes, depending on the level of service for which a particular organization has contracted. Particularly in the case of mobile devices, client devices 2107a-n may not always connect through the same access points, so the network performance testing data from each client device can be routed to the appropriate service level handler 2103, 2104, 2105 for an organization based on a client device identifier (which may be a MAC address, or some other identifier).

In some cases, a manual or ad-hoc level of service 2103 may be provided. For individual client devices 2107a-n or small groups of client devices 2107a-n, for example, statistical sampling methods may be irrelevant, or the level of network performance testing traffic may be high in relation to available bandwidth, or the cost of a higher level of service may be too great. In such cases, the client device 2107a-n could be configured to perform network testing either at the request of the user of the client device 2107a-n, or possibly triggered only by network conditions indicating poor network performance. In some embodiments, the client device may be configured such that the user of the client device can initiate a network performance test, see the results and/or and have the test results sent directly to a support center (aka help desk, technical support, etc.) wherein, when the user calls the support center, the support center staff have test results for that particular device available to assist with troubleshooting the problem of the user. In other embodiments, the client device may be configured to perform a voice/audio test, wherein a voice or audio sample is sent to and received from a server, analyzed for audio quality, and the client device provides an indication of voice/audio quality (e.g., a green, yellow, or red indicator). In some embodiments, if the client device detects a major network or connectivity problem, the client device may automatically notify the user of the nature of the problem (e.g., the client device has lost its connection with its domain name system (DNS) server, and thus has no Internet access) and provide the user with a support center phone number to call to report the problem and get help.

In some cases, a limited or periodic service 2104 may be more appropriate. For mid-sized groups or organizations, statistical sampling may be relevant, but the cost of "always on" or full service may be too high, in which case limited or periodic testing may provide acceptable network performance management in terms of balancing of cost, bandwidth utilization, and sufficient network performance testing detail. For example, a limited service 2104 may, for example, run most tests on user demand and results may be submitted to their configured destination (help desk), perform connectivity testing on an "always-on" basis, but submit results only on user demand, locally store test result history which can be collected periodically by control server, periodically change some client devices 2107a-n to the full service operating mode to gather additional data in response to certain network events.

In some cases, a full or always-on service 2105 may be most appropriate. For large-sized groups or organizations, networks may be large, and maximization of network performance (or reliability) may be a key concern, the ability to capture an appropriate level of detail will be critical. In such cases, a full or always-on service 2105 may be utilized, in which data are continuously sampled from a statistically-representative sample of the client devices 2107a-n on that network, and continuously managed by the service level manager. A full service 2105 may, for example, run tests on a schedule based on their test profile instructions, may perform passive tests run on a configurable schedule, often as frequently as the platform allows, may perform active tests on a configurable schedule, may have connectivity testing "always-on" with results submitted continuously.

In all service levels, client device monitoring and reporting of network performance may be dynamically scaled according to network conditions. For example, networks tend to perform acceptably most of the time, so gathering of large amounts of network performance data during periods of good performance simply wastes computing and storage resources. However, when problematic network events do occur, it is often necessary to gather more detailed data to troubleshoot the problem. The control server 2101 and/or the service level manager 2102 may dynamically instruct client devices to perform additional and more frequent testing if reported data indicate a network problem. Alternately, the client devices 2107a-n themselves may be configured to dynamically adjust the types and frequency and granularity (i.e., level of detail captured during testing) of testing to increase the level of detail available if a network problem is indicated. In some cases, for example poor connectivity or throughput, these additional data may be stored locally on the client devices 2107a-n, and reported after the network problem improves. As examples of such operation, client devices 2107a-n may be configured to summarize and store test results and analysis which fall in acceptable performance range in local storage for a configurable time period, and detail and store test results and analysis which fall outside acceptable performance range in local storage for a configurable time period. In some embodiments, client devices 2107a-n may be configured to operate as a stand-alone client device. In that case they may be configured to send a notification to "help-desk" or other consumer of problem information e.g. Network team etc. In some embodiments, client devices 2107a-n may be configured to provide anonymous data to the control server 2101.

FIG. 22 is a diagram showing an exemplary architecture for capture of connectivity and network performance data on client devices. Here, a client device 2210 is shown with certain key components for capturing connectivity and network performance data. A wireless device 2213 is a hardware device containing a wireless radio with receive and transmit capabilities. The wireless device 2213 may be configured to use any of numerous types of wireless frequencies and protocols, including, but not limited to WiFi, Bluetooth, and cellular. A wireless device driver 2214 is installed on the client device 2210, which is software that allows the operating system 2215 to interface with, and control the operation of, the wireless device 2213. System logs 2211 are stored by the operating system 2215 and other components of the client device 2210 containing details regarding operation of the client device 2210 and its components, and often contain useful information about connectivity and network performance. A software application 2212 (often called a software agent when used in this fashion) is installed on the client device 2210 to gather, analyze, and report connectivity and network performance data for the client device 2210. The software agent 2212 typically runs as a background process, and is not visible to the user, except when providing network status reports to the user.

The software application 2212 may either passively monitor the wireless device driver 2214, the operating system 2215, and the system logs 2211 for network performance data, or may conduct active network testing. When the wireless device 2213 attempts to connect with an access point 2201, the software application 2212 gathers data regarding network events, conditions, and performance issues such as, but not limited to type of wireless device hardware and firmware, version of wireless device driver, client device hardware and software, operating system type and version, type of connection (e.g., WiFi, Bluetooth, etc.), speed of connection (determined by handshake), failed 802.11 authentications, DNS failures, no IP address/bad IP address, no internet connectivity, etc. The software application 2212 may perform network performance analyses on the data such as signal strength, nominal connection speed, throughput speed, and the like, and may perform calculations such as average, mean, and mode, or percentile, quartile, etc., of certain metrics. Changes to metrics over time may be recorded and correlated with network performance impacts. In some embodiments, the software application 2212 may be configured with a wireless performance monitor that uses packet and frame filtering to extract and infer network performance data that are either not otherwise available or are not supported by any other components or functionality of the client device 2210.

Figure 23:
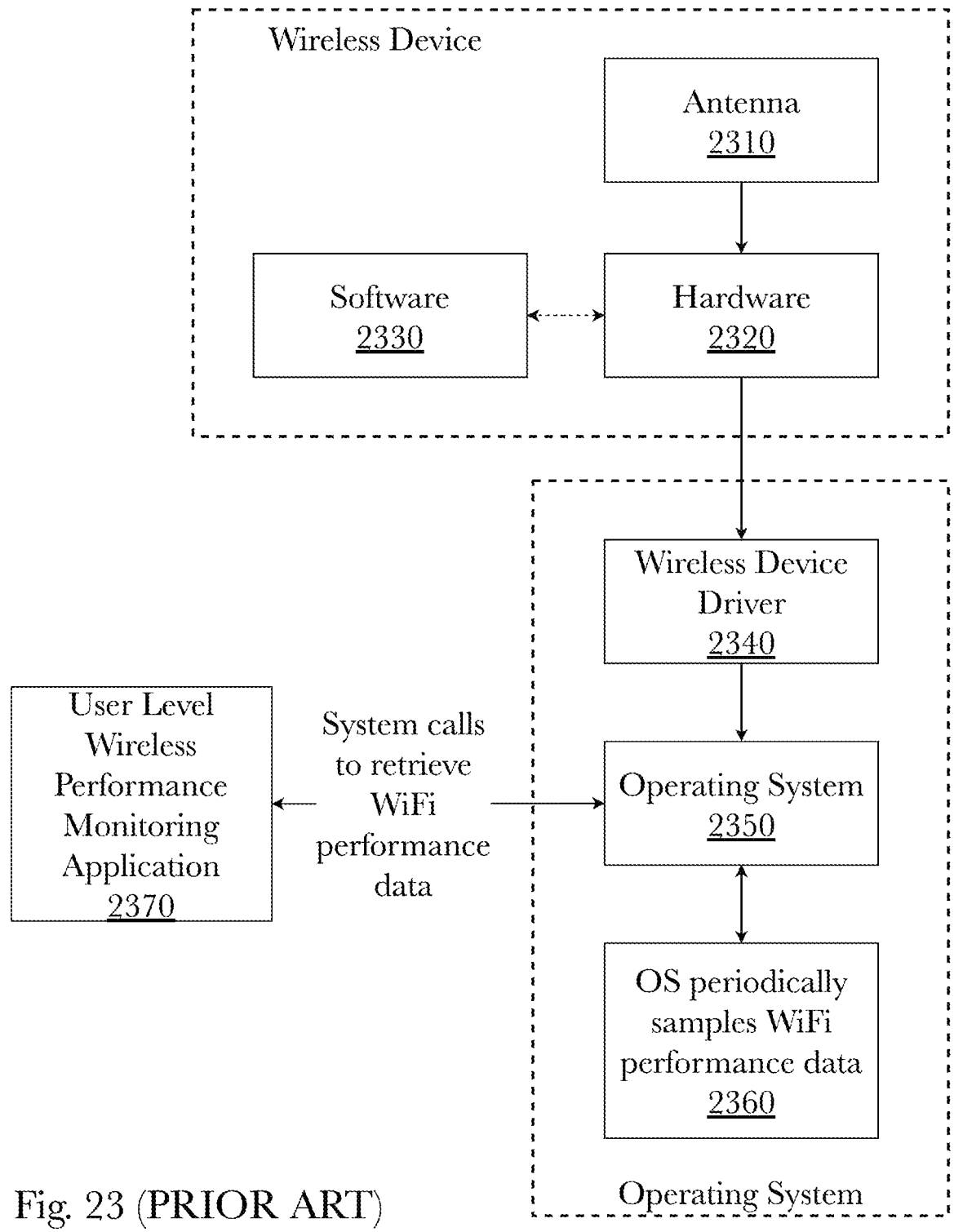
FIG. 23 (PRIOR ART) is a system diagram illustrating the existing methodology for monitoring wireless performance on a client device.

FIG. 23 (PRIOR ART) is a system diagram illustrating the existing methodology for monitoring wireless network performance. An antenna 2310, or multiple antennae, receives wireless signals used to communicate between devices. The wireless device 2320, in conjunction with the wireless device driver 2330, processes the signals into data packets complying with 802.11 standards. The wireless device 2320 forwards the data packets, through a device driver 2340, to the operating system 2350 of the computer to which the wireless device is attached. The operating system 2350 periodically samples wireless performance data 2360. In response to system calls by a user level wireless performance monitoring application 2370 (typically running on the same computer as the operating system 2350), the operating system 2350 provides the sampled wireless performance data for analysis. Because of the various layers, interfaces, and inconsistent operating system sampling rates, this methodology can be very inaccurate.

Figure 24:
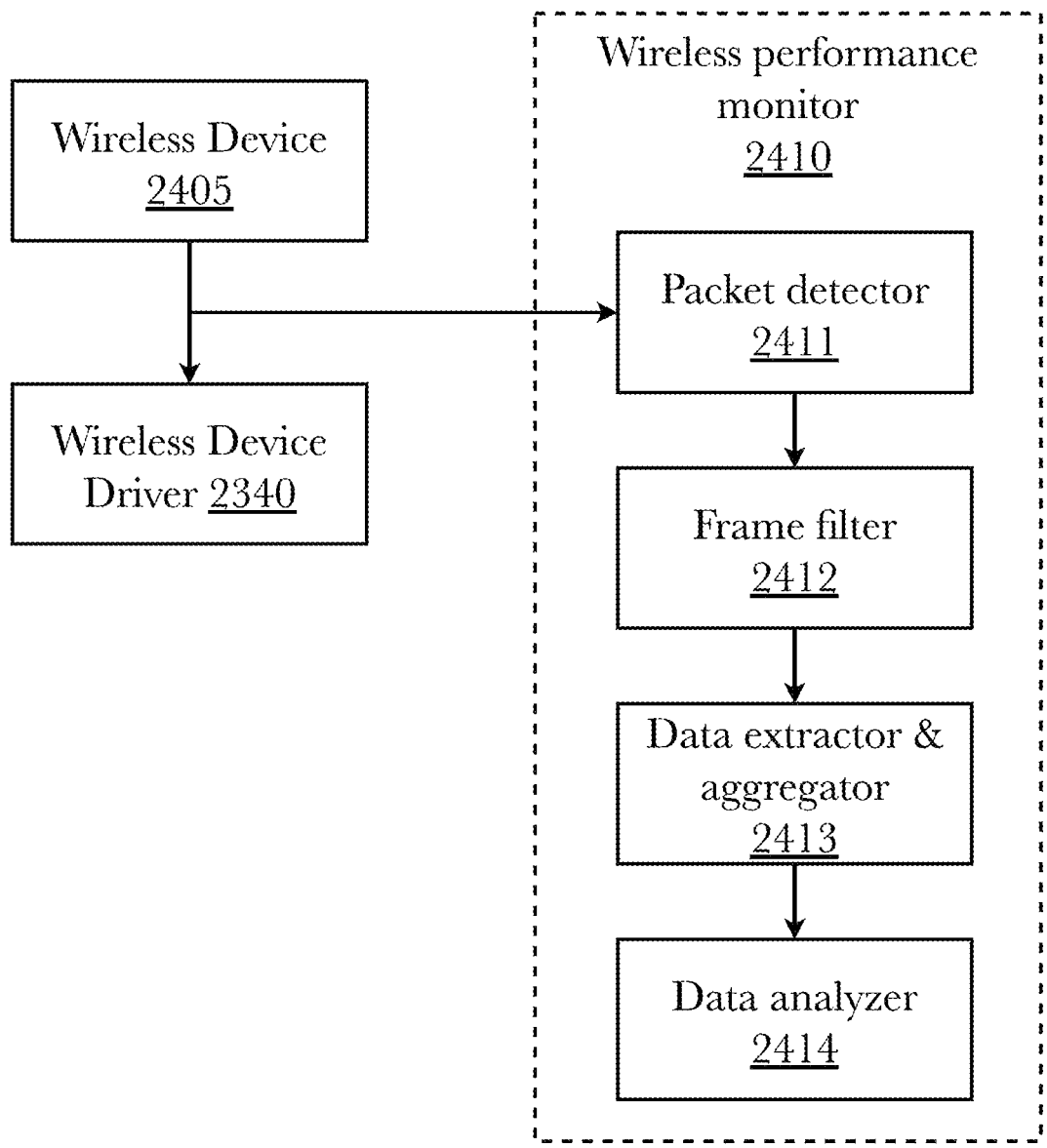
FIG. 24 is a diagram showing additional detail of an exemplary architecture for capture of connectivity and accurate network performance data on client devices, even where the client device does not support such capture.

FIG. 24 is a system diagram of a WiFi performance monitor 2410, according to an embodiment. In this embodiment, the software application 2212 is configured with a wireless performance monitor that uses packet and frame filtering to extract and infer network performance data that are either not otherwise available or are not supported by any other components or functionality of the client device 2210. The packet detector 2411 may be a dedicated hardware unit or software running either on a wireless device or a computer to which a wireless device is located, and is configured to intercept or receive packets from a wireless network for further analysis. In one embodiment, the packets are intercepted as they are sent from a wireless device 2405 to a device driver 2340 for further interaction with an operating system. A frame filter 2412 operates on raw packet data received from a packet detector 2411, filtering out frame data that do not contain useful information (for example, empty/null frames). A data extractor and aggregator 2413 may extract and aggregate relevant data from packets, such as data rates and retry rates and pass it to a data analyzer 2414 to analyze wireless network performance such as actual throughput versus nominal data rates.

The wireless performance monitor 2410 monitors and evaluates wireless configurations and capabilities via protocol packet analysis, noting changes over time and correlating with performance impacts. By analyzing frame data from wireless data packets, the wireless performance monitor 2410 can extract information about connectivity and network performance that is typically not reported by any other client device 2210 system, including the operating system. For example, depending on the information contained in the frames, the wireless performance monitory 2410 may be able to extract such information as an access point's vendor identity, the access point's capabilities, data rates supported, the network type/mode (e.g., for WiFi connections, 802.11 a/g/n/ac/ax), features supported (e.g., for WiFi connections, 802.11 k, v, r), and similar information.

Further, the wireless performance monitor 2410 can be used to infer information not supported by a client device or not provided by the client device with sufficient accuracy. In some embodiments, for example, the wireless performance monitor 2410 may be configured to infer the modulation and coding scheme index (MCS index) for a given wireless connection. Each MCS index represents a set of frequency, streams, modulation, and coding that establish the maximum data rate/bandwidth that can be achieved using that index, and is an important piece of information in evaluating certain wireless network performance metrics.

Where the operating system 2215 of the client device 2210 supports MCS capture and reporting, the MCS index may be sourced from the operating system 2215. However, despite the importance of the MCS index in wireless communications, many client device 2210 operating systems 2215 don't support capturing or reporting of it. Where the MCS index cannot be sourced from the operating system 2215, there was heretofore no means of obtaining it. However, the MCS index can be inferred from analysis of frame data from wireless data packets.

In order to infer the MCS coding, both the access point's capabilities and client device capabilities must be known. This information can be gathered during the connectivity handshake, when two wireless devices negotiate to determine what settings to use. A handshake involves sending parameters back and forth between the wireless devices to determine the parameters under which they can communicate with one another. These parameters are codified into sets in the MCS index. By collecting data regarding data rates, error rates, and other parameters from the wireless data packets exchanged between the wireless devices, an MCS index can be inferred. Existing methodologies for determining wireless performance are too inaccurate to allow an MCS index to be calculated, but by intercepting the wireless data packets during or just after transmission, accuracy improved to the point where an MCS index can be inferred. Once the MCS index has been inferred, other information may be calculated such as calculating throughput based on retry rates determined from packet inspection.

Certain types of testing may be contingent or otherwise influenced upon observed station utilization conditions as determined by monitoring system calls to the operating system's 2215 for resources which may either be negatively impacted by running a test or which might lead to false positives or other inaccuracies in network performance monitoring. For example, when the client device 2210 is running a high-bandwidth/CPU-intensive task like video conferencing, running a mean opinion score (MOS) test or a throughput test will likely reduce available bandwidth or computing resources and interfere with the video conference. Other tests may be enabled or restricted depending on the capabilities of the client device 2210 and its components. Some tests may also be selected as a result of the station's conditions for example, intermittent connectivity error might lead to more or different connectivity testing.

Figure 25:
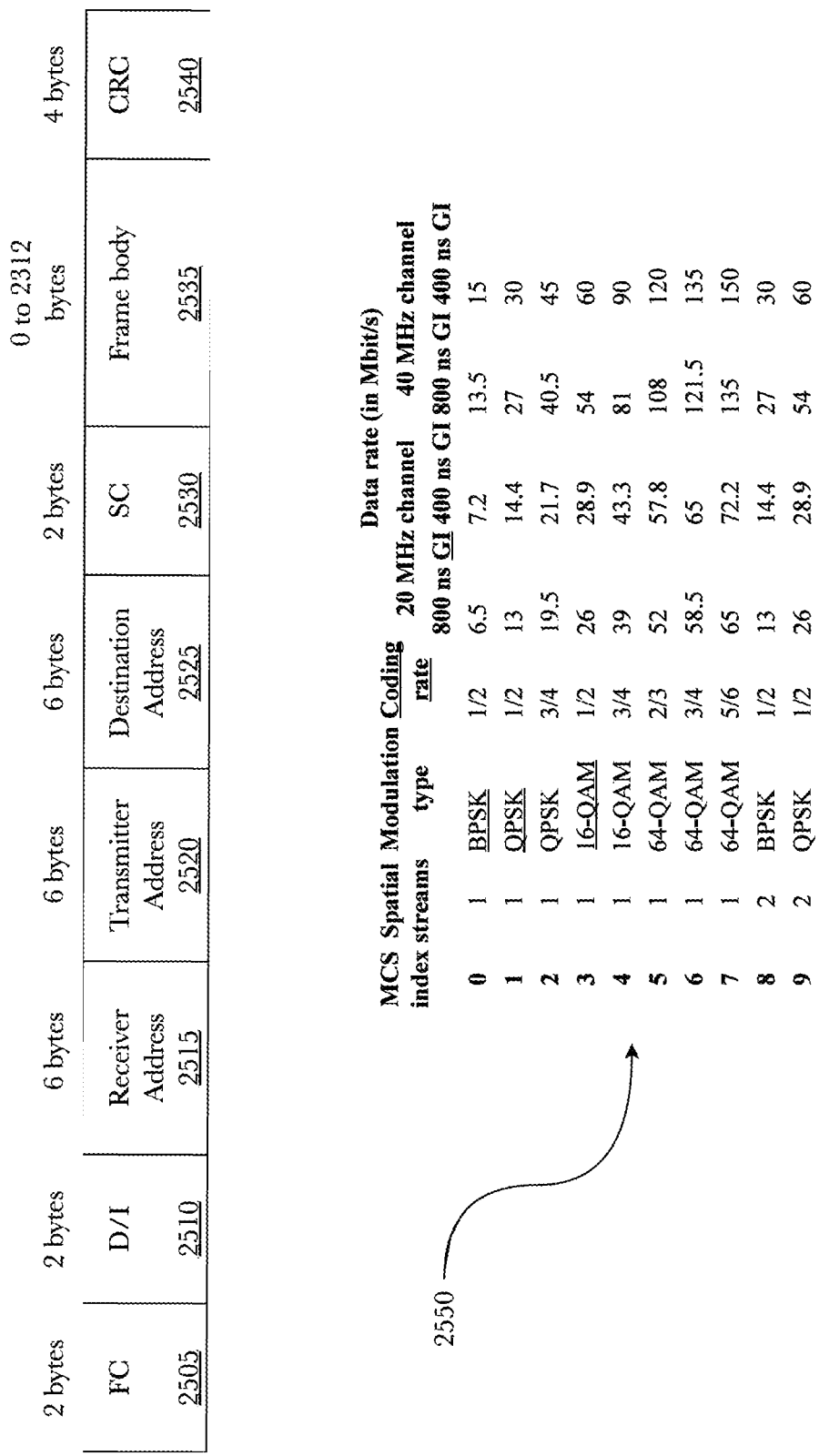
FIG. 25 (PRIOR ART) is a data diagram of an example 802.11 data packet and the associated content types.

FIG. 25 (PRIOR ART) is a data diagram of an example 802.11 data frame and the associated content types. Part of an 802.11 data packet is a frame control ("FC") 2505, which indicates the type of frame (control, management, or data) that is present in the packet, and provides control information. Control information may include whether the frame is to or from a distribution system, fragmentation information, and privacy information. Duration/Connection ID ("D/I") 2510 is also present in a data frame. If used as a duration field, it indicates the time (in microseconds) the channel will be allocated for successful transmission of a media access control ("MAC") frame. In some control frames, this field contains an association, or connection, identifier. Also present are a possible plurality of addresses 2515, 2520, 2525, the number and meaning of the address fields varying depending on context. The transmitter address 2520 and receiver address 2515 are the MAC addresses of stations joined to the basic service set that are transmitting and receiving frames over the network. A service set identifier (SSID) identifies the wireless network over which a frame is transmitted. The source address 2520 and destination address 2525 are the MAC addresses of stations, wireless or otherwise, that are the ultimate source and destination of this frame. The source address may be identical to the transmitter address and the destination address may be identical to the receiver address. The sequence control ("SC") 2530 portion of a frame contains a 4-bit fragment number subfield, used for fragmentation and reassembly, and a 12-bit sequence number used to number frames sent between a given transmitter and receiver. The frame body 2535 contains a MAC service data unit ("MSDU") or a fragment of an MSDU. The MSDU is a logical link control ("LLC") protocol data unit or MAC control information. Lastly, a frame check sequence 2540 is included, which is a 32-bit cyclic redundancy check ("CRC") which may provide error checking capabilities.

Further, a table showing the first ten modulation and coding scheme (MCS) indices is shown 2550, illustrating the sets of frequency, streams, modulation, and coding in each MCS index, and which establish the maximum data rate/bandwidth that can be achieved using that index. However, despite the important of the MCS index in wireless communications, many operating systems don't report it.

Figure 26:
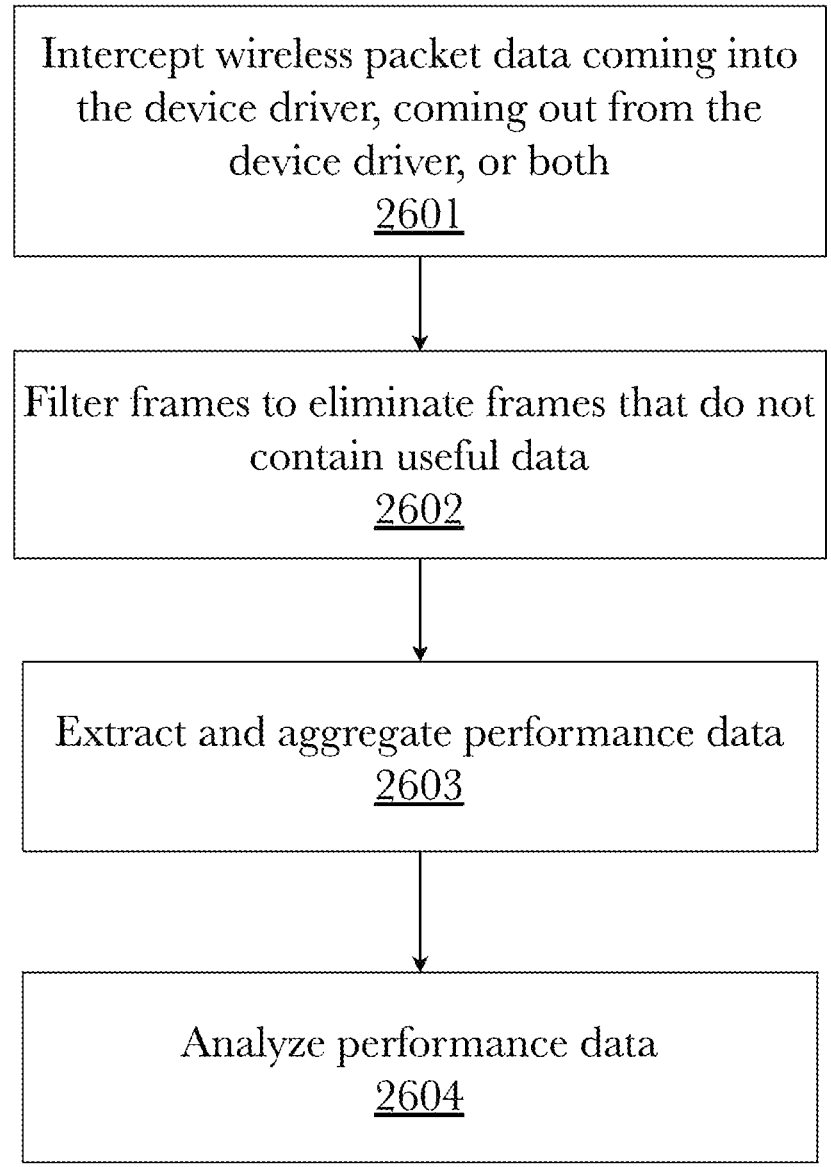
FIG. 26 is a method diagram for wireless performance monitor, according to an embodiment.

FIG. 26 is a method diagram for wireless performance monitoring. In a first step, wireless data packets are intercepted as the are received by the device driver, as they are sent out from the device driver, or both 2601. While in many cases capturing the wireless data packets before or after the device driver may be sufficient, for some inference cases it is necessary to capture the wireless data packets both before and after the driver. An example of this situation is estimating frame duration in order to infer the approximate MCS index. The method further comprises the steps of filtering out frames that do not contain useful information 2602 (e.g. empty/null frames), and extracting and aggregating relevant data from packets 2603, such as data rates and retry rates, and using the data to analyze wireless network performance 2604, such as actual throughput versus nominal data rates.

DETAILED DESCRIPTION OF EXEMPLARY EMBODIMENTS

Figure 2:
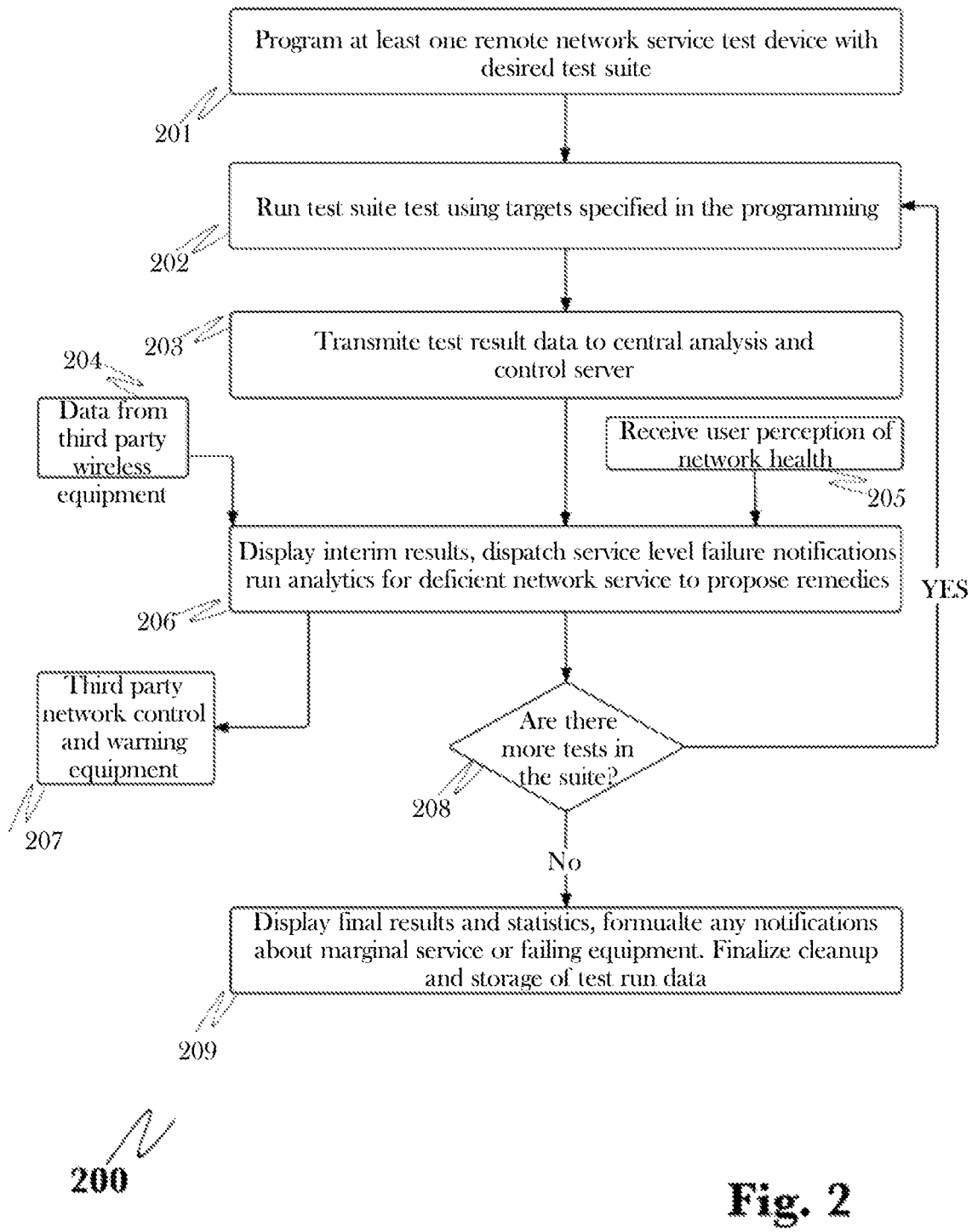
FIG. 2 is a flow diagram illustrating an exemplary method for measuring and reporting wireless network service quality using remote devices, according to a preferred embodiment of the invention.

FIG. 2 is a flow diagram illustrating an exemplary method 200 for measuring and reporting wireless network service quality using remote devices, according to a preferred embodiment of the invention. To perform reproducible testing at least one, probably more than one, of remote wireless network testing devices 115 as depicted in FIG. 1 must be programmed with the suite of tests to be run 201 as depicted in FIG. 1 116, 111, 115. These remote test devices 115 then run the tests specified in test suite 202, which are attached to a unique test suite specific ID, such as but not limited to: wireless signal strength at test device location; wireless network BSSID; ability and latency logging onto the wireless network; negotiated wireless standard; signal level, wireless signal band or bands offered; ping round trip times; ability to upload and download data to LAN resident and cloud based dedicated targets, if available, measuring latency, data bandwidth, voice quality, video quality, packet loss, jitter; ability to access specified web pages and retrieve resources; ability to access the company's wireless phone carrier, if applicable; and ability to contact dedicated or critical phone targets and upload or download either voice or other data based on the needs of the customer. There are of course other tests known to the art and no feature precludes the invention from performing any of them should a customer desire. While there are circumstances where the results of one or more wireless network tests are stored on the remote wireless network test device such as inability to functionally access the target wireless network or tests in the programmed test suite that specify that a second RF radio based wireless network be probed where only one RF radio exists on the test device, where, in both cases results are stored and transmitted, each associated with the test suite's ID upon re-establishment of connection with the central analysis and control server 111 as depicted in FIG. 1 routinely; however, test result data are transmitted to central analysis and control server 111 with the test suite specific ID at time of test completion 203 such that interim results are as up-to-data as possible. At the central analysis and control server, test result data from remote wireless service quality test devices 115 may be combined with information retrieved from third party sources 204 such as wireless access points 121, 141, that serve the tested wireless networks 120, 140. Examples of information provided by wireless access points may be, but is not limited to: RF Radio transmit strength, BSSID of the access point, wireless standards supported, wireless standards (example: Wi-Fi b, g, a, n, ac) in use as well as device or devices using each standard, percent bandwidth capacity under which the access point is currently operation and any recent warnings or failures in the access point's logs. Information may also be retrieved from other third party devices 124 as available. Central analysis and control server 111 may also receive user perception data 205 concerning the function of the wireless network during testing, either through pre-designed multiple choice questionnaires or interpreted freeform text descriptions, this is especially probable if service deficiencies are determined by other tests in the suite as knowing user experience during those instances may be especially helpful. Within central analysis and control server 111, data received from previously mentioned sources and possibly other sources specific to the needs or the test suite customer, are transformed using pre-programmed analysis functions to produce a representation of all tested aspects of network function. While these representations may be purely numerical, such a display is very difficult to quickly analyze and results are thus usually depicted as a proportion of 100% function with customer-decided minimum service levels as line graphs over a time period of interest 206. Given possession of floorplans and wireless access point maps, the system may also display service quality, coverage, congestion, failures, errors, user feedback and similar factors as colored topographical like maps to make interpreting the data and possible problem areas as easy as possible. Drops in service quality below certain limits may have profound consequences on customer operations and therefore central analysis and control server 111 has APIs to communicate with third party alarm and control systems 207. For example, over the past decade the proportion of hospital monitors and actuators that are wirelessly connected has greatly increased due to obvious convenience. However, if wireless service quality falls below a certain level within parts or all of the hospital for some reason, other methods for connect and control of that equipment is needed. The API of the central analysis and control server may communicate with the hospital's administration system to issue the needed advisories and alarms per hospital protocol. The API would, of course, function similarly in many other less drastic situations, but the server also includes analytics programming that allows it to combine data from different sources and different test suite which may uncover small irregularities in previous service levels or current equipment function such that a specific root cause and remedy for an issue at hand may be proposed by the central analysis and control module with the data 206. It may be that at least one test in the test suite is meant to recur a certain number of time, possibly indefinitely. The recurrence of tests and their time of run are controlled within the programming 208 and tests will continue to repeat automatically for the length programmed. Finally, results and statistics may be displayed, along with notifications about marginal service or failing equipment, and final cleanup and storage of data will be performed 209.

Figure 3:
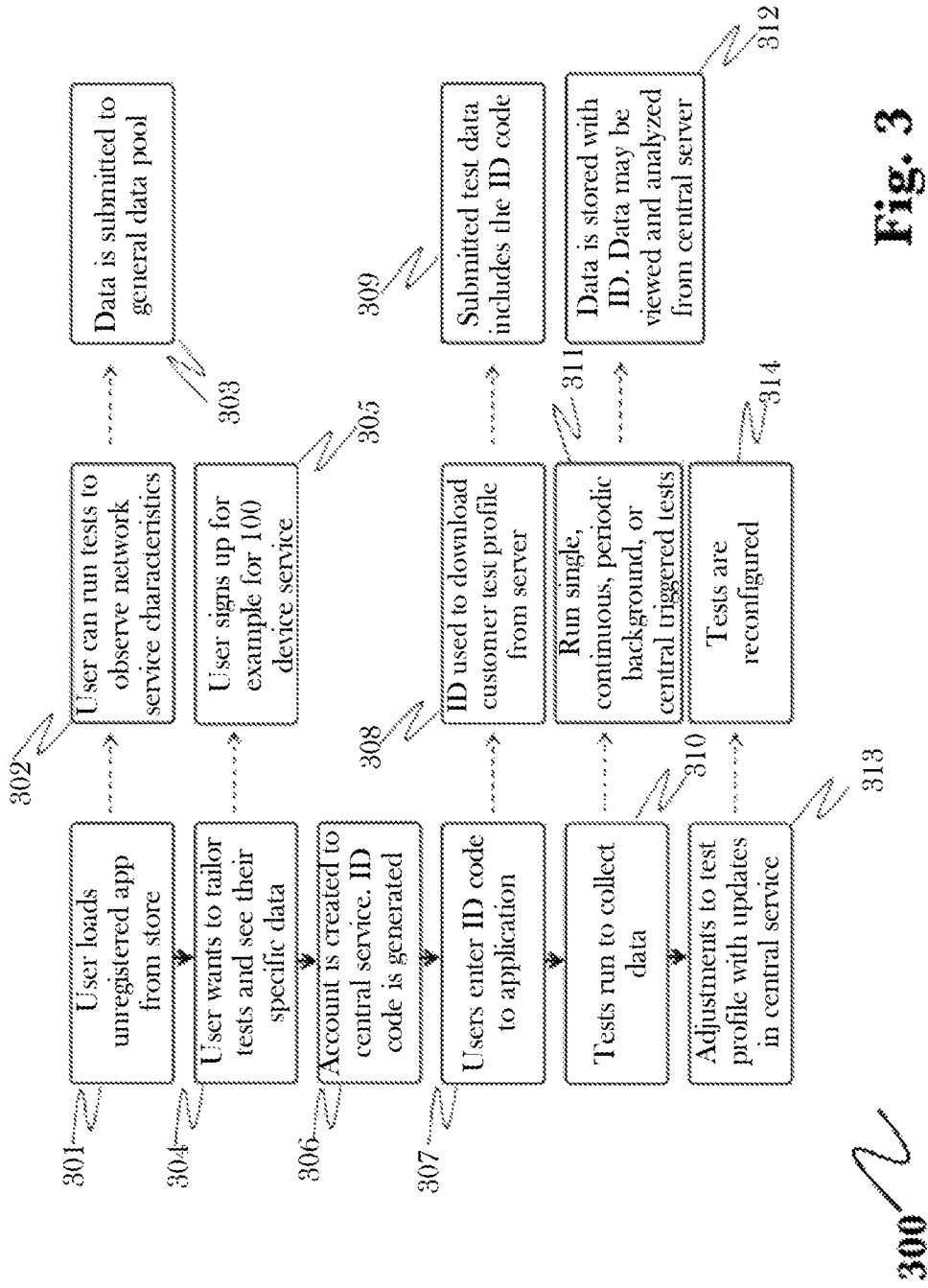
FIG. 3 is a flow diagram illustrating an exemplary method by which the system is programmed with customer specific test suites according to a preferred embodiment of the invention.

FIG. 3 is a flow diagram illustrating an exemplary method 300 by which the system may programmed with customer specific test suites according to a preferred embodiment of the invention. As previously mentioned, it is possible for an unregistered system user to download the wireless network service quality framework application 301 onto a compatible remote device (see FIG. 1, 115) and run basic network service quality tests 302. While the results of the tests may be individually reviewed on the remote device 302, it may not be uploaded to a central analysis server (see FIG. 1, 111) for further analysis or combined with other tests that might be run at approximately the same time either on the same remote test device or on another remote test device. Nor may the results be saved for later specific retrieval 303, and are therefore, under these conditions only and isolated snapshot of network function. If a user wants to take full advantage of the capabilities of the system 304, she must sign up for service, in this embodiment the user signs up for 100 remote test device service 305. At this point an account for the user is created on the central server, a unique ID code is created for her and she is consulted concerning the specific tests that would be most useful under her current wireless network operating conditions and perceived issues 306. This results in a suite of tests being created for the user connected to her unique account ID. When prepared to start testing the user need only enter her unique account ID into the running framework application running on each of her remote network test devices 307, which will result in her pre-programmed test suite being downloaded 308 and run 310 on each of her remote network test devices and this data, associated with the unique account ID may be stored 309 and used with data bearing the same ID to perform in depth, coordinated analysis by the central server 312. With the unique ID, it is now also possible to create more complex testing protocols that are run on each remote network testing device associated with the user's ID 311, single tests may be run, continuous tests may be run, tests may be run periodically in the background without intervention, or tests may be uploaded and then triggered by central server. Finally, as the testing runs mature at the user's location, the tests may be modified 313 to better reflect the user's needs and these revised tests seamlessly uploaded to the remote network test devices from the central server 314 without remote test device operator intervention.

Figure 4:
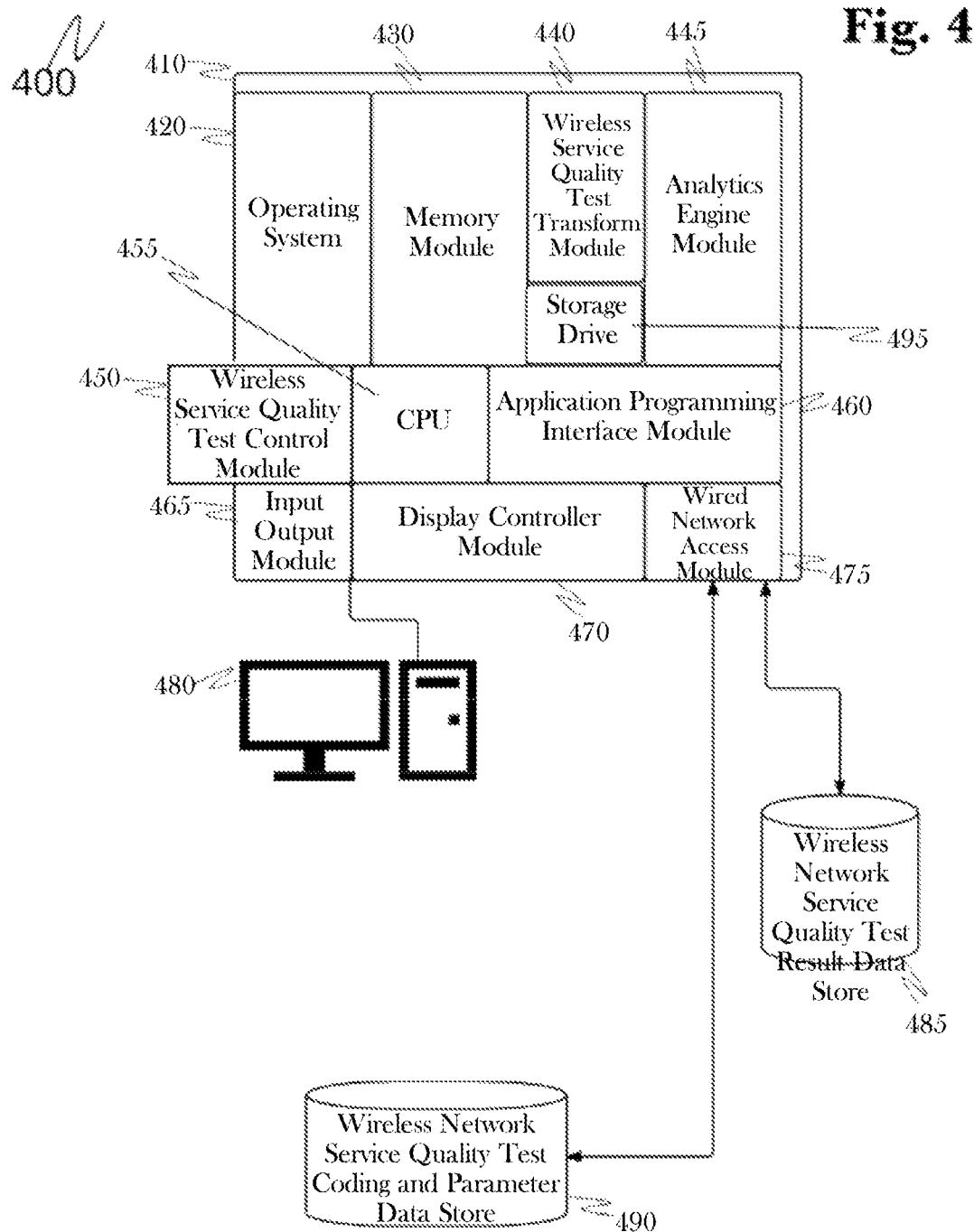
FIG. 4 is a block diagram illustrating an exemplary system architecture for central analysis and control server to analyze network service quality using remote devices, according to a preferred embodiment of the invention.

FIG. 4 is a block diagram illustrating an exemplary system architecture for central analysis and control server to analyze network service quality using remote devices, according to a preferred embodiment of the invention. As seen, 400 central analysis and control server 111, and 410 has many components expected for a computing device FIG. 5, 20 such as, but not limited to: operating system 420, memory 430, CPU 455 I/O controller module 465, video card 470, storage drive 495 and wired network access module 475. In addition to these components, the central analysis and control drive also has a wireless service quality test control module 450, which receives customer specified test suites and modification parameters from a centralized possibly cloud based wireless network service quality test coding and parameter data store 490 then uses that programming to configure a plurality of mobile wireless network service quality test devices 115, which run the test suites and collect the correct, customer-requested data. Wireless network performance test data are sent back to the wireless service quality test transform module 440 of central analysis and control server 410 where specific preprogrammed algorithms are performed against them to establish performance levels using multiple aspects of wireless network operations additional data received from third party sources, such as wireless access points within the probed wireless network and received through application programming interface (API) module 460 may also take part in the calculations. The analytics engine module 445 may also take part in the routine calculations. Results of the test suite may be shown to end users on system interaction display 480, which may range from a dedicated display and keyboard on the central server to a serial or network attached workstation, in one or more formats specified by the customer prior to test setup FIG. 12.

Deficiencies in network performance compared to customer service level requirements may invoke the collection of additional information through both the mobile wireless network service quality test device 115 and communication with third party devices through the central server's API 460. All gathered data may then be submitted to the central server's analytics engine module where it, data obtained from wireless equipment manufacturers and vendors, specialized predictive programming and data stored from past test wireless network runs may be used to formulate a root cause. Notifications, warnings and alarms specified by the customer will also be implemented at this point. All data will be saved in data store 485 for possible further analysis and record keeping.

Figure 5:
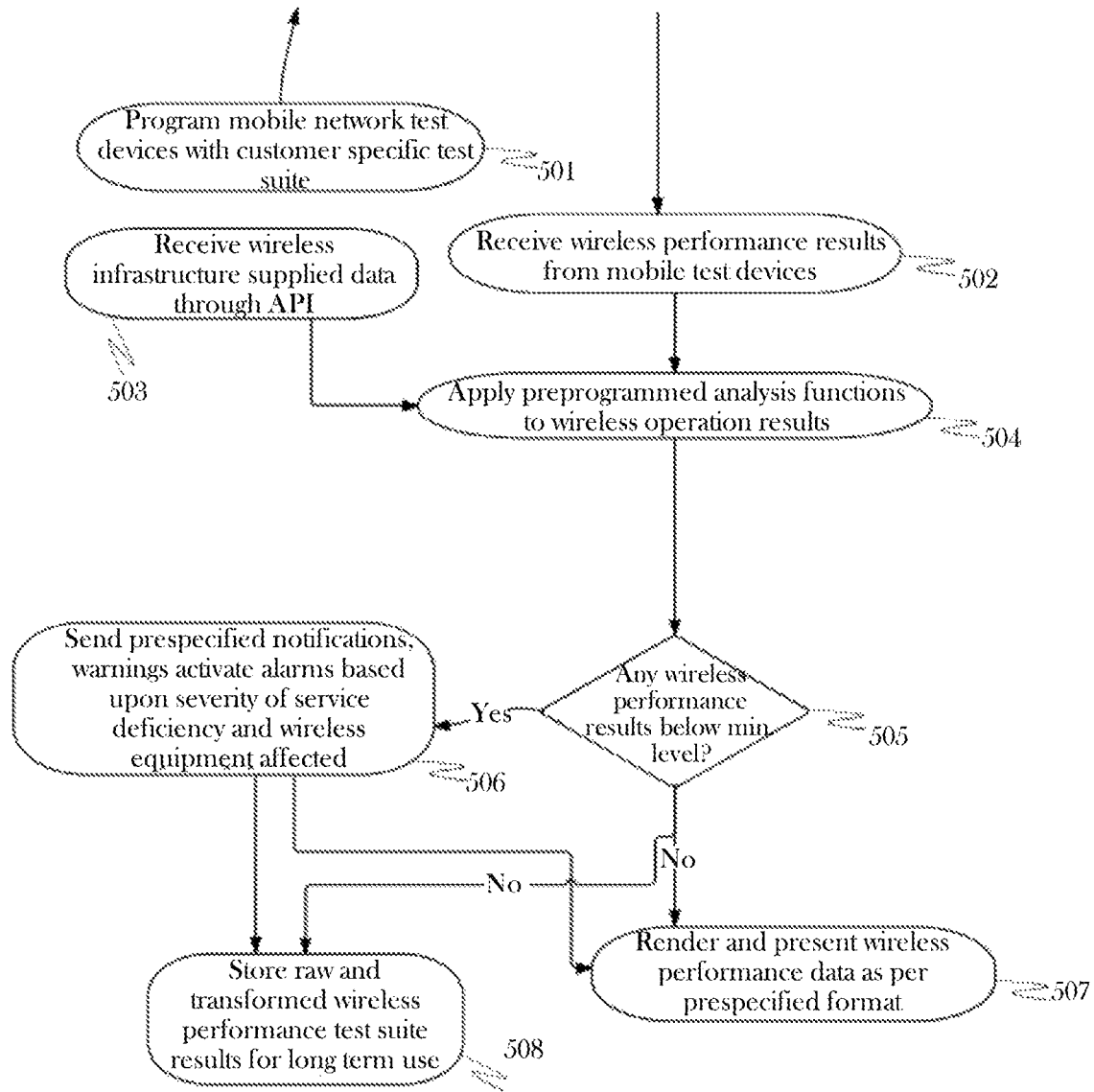
FIG. 5 is a flow diagram illustrating an exemplary method by which central analysis and control server may interact with other components of the system and analyze network performance test data according to a preferred embodiment of the invention.

FIG. 5 is a flow diagram illustrating an exemplary method 500 by which central analysis and control server may interact with other components of the system and analyze network performance test data according to a preferred embodiment of the invention. In this embodiment, the central analysis and control server 111, 410 first programs a plurality of mobile network test devices 115 with test suite and connected parameters 501. These test may recur automatically at set time intervals indefinitely, recur a predetermined number of times either regularly or pseudo-randomly, or occur one time only. Mobile network test devices then carry out those tests and send the wireless network performance data back to the centralized analysis and control server 502. The centralized server then applies a plurality of customer specified preprogrammed analytical functions on that data 504 and may also employ data obtained directly from third party wireless network equipment such as, but not limited to: wireless access points and signal amplifiers and repeaters 503. A major focus of analysis is to determine whether there are any wireless network performance parameter that fall below pre-established customer service quality level minimums 505. When all parameters are found to be at or above pre-established customer service quality level minimums, results are sent to long term storage 508 and they are presented as per specified customer rendering choices 507. However, if any of the parameters specified by the customer to have a minimum acceptable service quality level are found to function below that level 506 customer required, notifications warnings may be automatically sent, and, based on severity and equipment probed, alarms may be activated and messages sent to third party equipment monitoring and control systems through the central server's API 112, 460. All results are placed into long term storage 508.

Figure 6:
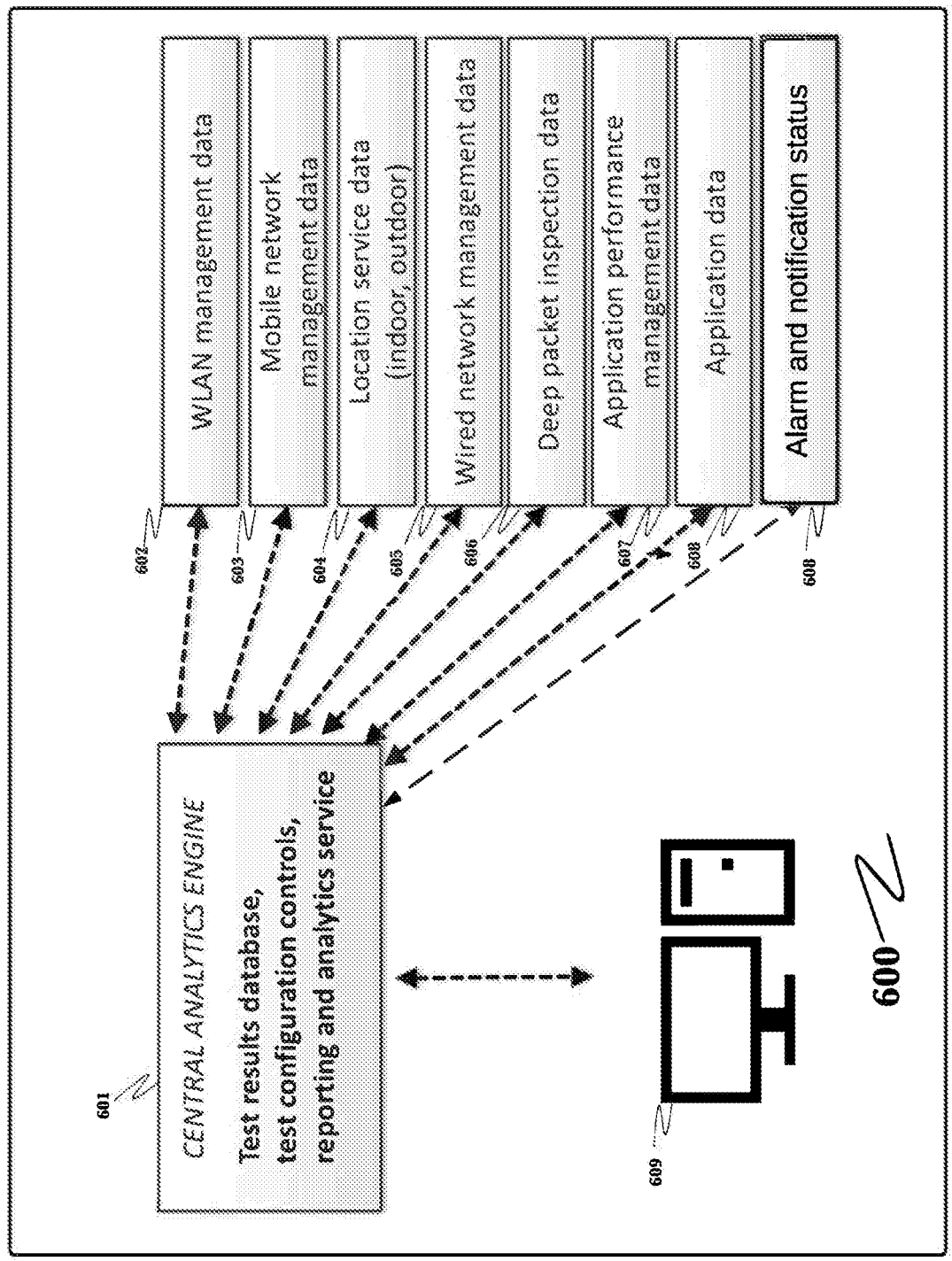
FIG. 6 is a diagram illustrating information that is processed by central analysis and control server analytics engine according to a preferred embodiment of the invention.

FIG. 6 is a diagram illustrating information that is processed by central analysis and control server analytics engine according to a preferred embodiment of the invention. Within the embodiment 600, central server analytics engine module 445 retrieves and makes use of many data from a plurality of sources to predict wireless network equipment that may be cycling towards failure or after a failure or significant deficiency in service has been discovered though testing, steps that may remedy the issue. Information employed comes from a set that includes the test result database 485, test configuration controls 601 and other sources that may include, but are not limited to, WLAN management data-tag-specific access points reporting errors in log, non-responsive 602, mobile network management data 603—to inform on wireless phone coverage issues, location service data (whether test device is indoors or outdoors)—test devices outside the building may show poor service, possibly by design 604, wired network management data-issues with wired network service may significantly affect resource availability outside of wireless service performance 605, deep packet inspection data-streams of packets from host, or malformed packets from host may be easily halted and service quality restored 606, application performance management data-heavily used mobile wireless network test device may issue inaccurate performance data 607, application data 608 and current alarm and notification status—In times of issue have notifications been sent, alarms activated 609. As described above root cause and potential remedies may be offered by the central analytics engine module 601.

Figure 7:
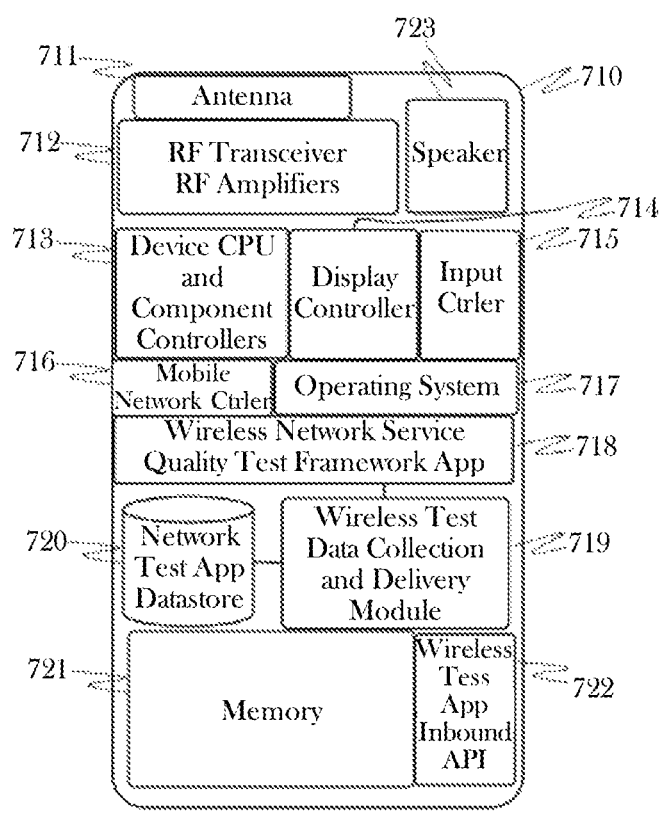
FIG. 7 is a block diagram illustrating an exemplary system architecture for mobile wireless service quality test device employed to analyze network service quality using remote devices, according to a preferred embodiment of the invention.

FIG. 7 is a block diagram illustrating an exemplary system architecture for mobile wireless service quality test device employed to analyze network service quality using remote devices, according to a preferred embodiment of the invention 700. The mobile wireless network service quality test device of the embodiment incorporates many of the components present in any handheld mobile device such as: antenna 711, RF transceiver and amplifiers 712, speaker 723, CPU and assorted device controllers 713, display controller 714, input controller 715, operating system 717, memory 721, mobile network controller 716—found in all wireless phone and data network connecting devices and an LCD display, not depicted for simplicity. The device operates as a wireless network performance probe through use of wireless network service quality test framework application 718 which in itself can run a plurality of simple network performance tests as a standalone device and when programmed with specific customer wireless network test suites by the system's central analysis and control server 450 can run a larger number of tests and send them back to the central server for further analysis, storage and reporting. Tests are run using the networking resources of the device through the wireless access circuitry present 711, 712, 713, 716. Results of each test which may include, but are not limited to steady state signal strength, variability in signal strength, signal to noise ratio, current percentage of network traffic versus network capacity, radio attachment latency, resource request latency, location of the test device, and ping response time are collected and transmitted to the central analysis server by direction of wireless test data collection and delivery module 719. The wireless network test device may also disconnect from the primary network temporarily to perform such tests as packet analysis and to scan the radio bandwidths used by the customer's wireless network for interference, multi-path effects. Similarly, the wireless network test device 710 may disconnect from the internal wireless network to measure the signal strength, connection latency and data rate of the customer's mobile phone provider's voice and data connection. Those skilled in the art may quickly recall other tests to be run, the list provided here is illustrative and should not be thought as limiting to the invention. When not connected to the central analysis and control server 410, the mobile wireless network test device uses its resident network test application data store 720. Once connection to the central analysis and control server is reestablished, the wireless test data collection and delivery module 719 retrieves the stored data from the network test application data store 720 and transmits it to the central analysis and control server 410. Under certain circumstances, the mobile wireless test device may send information inquiries to known high volume web sites such as, but not limited to FACEBOOK™, SKYPE™, CHROME™ and GOOGLE™ using wireless test application inbound API 722 as part of a test suite.

Figure 8:
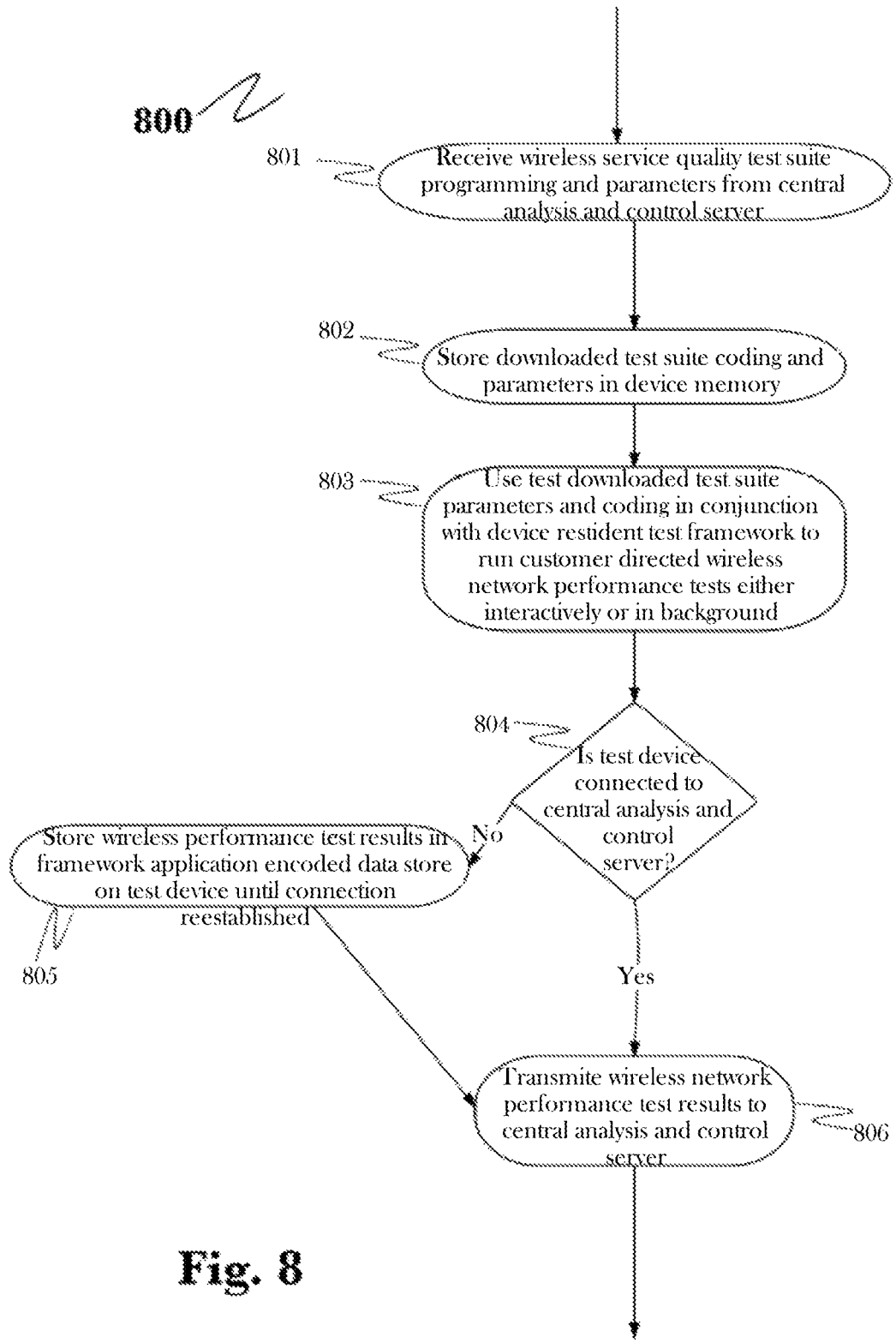
FIG. 8 is a flow diagram illustrating an exemplary method by which mobile wireless network service quality device may operate to collect store and transmit test suite data according to a preferred embodiment of the invention.

FIG. 8 is a flow diagram illustrating an exemplary method by which mobile wireless network service quality device may operate to collect store and transmit test suite data according to a preferred embodiment of the invention 800. The mobile wireless network service quality device receives coding and parameters for a customer directed network performance test suite from the central analysis and coding server 801 which it stores 802 and uses in conjunction with a preloaded resident test framework application 803. The tests of the test suite uploaded may be executed interactively or programmed to run in the background, possibly in an automatic recurring fashion that continues indefinitely or is finite in their repetition 803. Single execution tests, are of course, also possible. Occasionally, a test or group of tests cause mobile wireless network test device to temporarily disconnect from primary wireless network and thus central analysis and control server, the target of collected wireless network performance data. Unexpected disruptions in primary network connection can also cause temporary loss of contact with central analysis and control server 804. Under these conditions wireless performance test data collected by mobile wireless network test device are stored in a test framework initiated data store 805. All wireless network performance data is eventually transmitted to the central analysis and control server 410 for transformation and long term storage 806.

Figure 9:
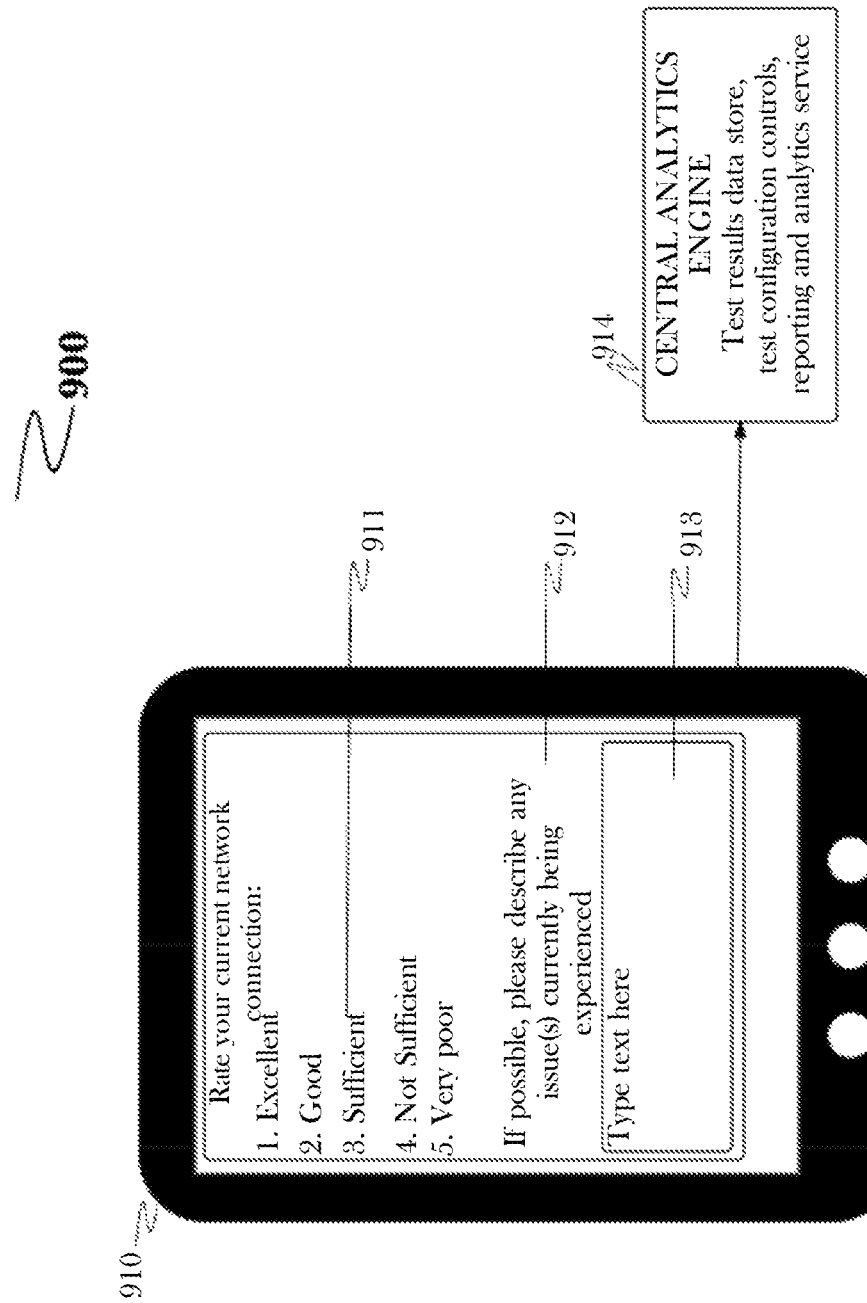
FIG. 9 is a diagram illustrating methods by which users of wireless networks being tested might submit their perceived experience to the wireless network service quality test system according to a preferred embodiment of the invention.

FIG. 9 is a diagram illustrating methods by which users of wireless networks being tested might submit their perceived experience to the wireless network service quality test system according to a preferred embodiment of the invention 900. It is often helpful when executing equipment performance tests, wireless network service quality tests in this case, to also know how a particular service level is perceived by the equipment users. Correlation between very positive performance test readouts and a similar user perception of service quality solidifies the validity test. Similarly, understanding the effect of what is considered mediocre, or unacceptable performance test readouts on user perception is equally important, if the test results are poor but the user response is positive at the same time, the tests employed may be inaccurate or may not be calibrated correctly. The invention may allow the collection of user experience feedback as part of wireless network service quality testing. In the current embodiment of the invention, user wireless network performance experience is collected using an applet that is part of the wireless network testing framework on the wireless network test device 910. A part of the applet displays a multiple choice request for user wireless network performance experience where the user can rate current network performance from one of five choices: "Excellent", "Good", "Sufficient", "Not Sufficient" and "Very Poor" 911. The second portion of the applet instructs the user to describe any issues she is having on the wireless network in freeform text 912 and then gives space to do that 913. Response text is interpreted and mapped to standardized terms by the central analytics engine as part of overall testing 914. The choice from the first portion 911 of the applet are similarly used to measure general wireless network performance.

FIG. 10 is a diagram illustrating both passive and active testing of more than one wireless network by wireless network service quality test devices according to a preferred embodiment of the invention 1000. The system 1001 has the ability to run tests on two separate networks within a single test suite. In the case of testing the corporation's wireless phone provider network connection 1003, this testing may occur actively, attempts to connect to designated phone exchanges, to download designated data or to connect to designated servers and web pages to list a few illustrative examples, or passively, measurements of signal strength at test location, signal to noise ratios, radio and connect acknowledgement latency. Results may be reported to the phone service provider's quality management as well as client corporate analysts once connection with the primary wireless network 1004 is reestablished at the conclusion of mobile network testing 1003. When two separate wireless networks 1004 that require use of the RF radio is planned, this may be accomplished in two ways. First, the remote test device may have simultaneous dual RF radio capability, in which case the second wireless network not depicted for simplicity may be probed and the resultant data immediately sent to the central analysis and control server 410 for inclusion in the analysis results made available to the end user 480. Alternatively, a remote test device with only single RF capability may disconnect from the first network 1004, connect to the second network to be tested and while probing the network, store the resultant data internally. Upon completion of inspection of the second network, the remote test device may disconnect from the second network, reconnect to the first network 1004 ad send all of the stored result data from the second network to the central analysis and control server 410 for inclusion in the test results of the current test suite and presentation to the end users 480. A second network service quality test device 1002 with both wireless 1004 network and wired network 1005 connection capabilities may be used to execute interactive and background network performance tests 1006, 1008, either active such as data throughput, retry number, and ping return time 1007, 1009 or passive such as deep packet inspection, packet capture and protocol analysis, packet drop rates and wireless radio channel usage is manners similar to those described above. Again, data would be sent to the central analysis and control server 410 as soon as a connection is reestablished.

FIG. 11 Is a list of methods by which the location of individual wireless network service quality test devices may be obtained according to a preferred embodiment of the invention 1100. The ability to position each wireless network test device at a specific location within the geography of the network greatly augments the value of the data collected as such things as coverage maps and access point identification can be made. The GPS system 1101 is an extremely accurate, automated method to establish test device location and also allows determination of test device movement, which can affect test data as the orientation of the device antenna changes and altitude which may play a role in specific circumstances. GPS signals can be weak or erratic indoors where may wireless network performance tests occur, then, other methods such as location determination by proximity to known Wi-Fi SSID/BSSID or visible light based data transmitter ("Li-Fi") or infrared sensor 1102, Wi-Fi location service, RTLS or similar where test device location is determined by differential signal levels, packet propagation delay or signal direction determination through use of a directional antenna pattern 1103. Test device location may also be determine using a magnetic location service which has been calibrated for a particular building or floor plan 1104. Less reliable, as it relies on manual response and a user's perception of the precise location in which she finds herself, is to have the user identify her location on a floorplan map 1105 or verbally provide her location in an uncoached, freeform manner 1106.

Figure 12:
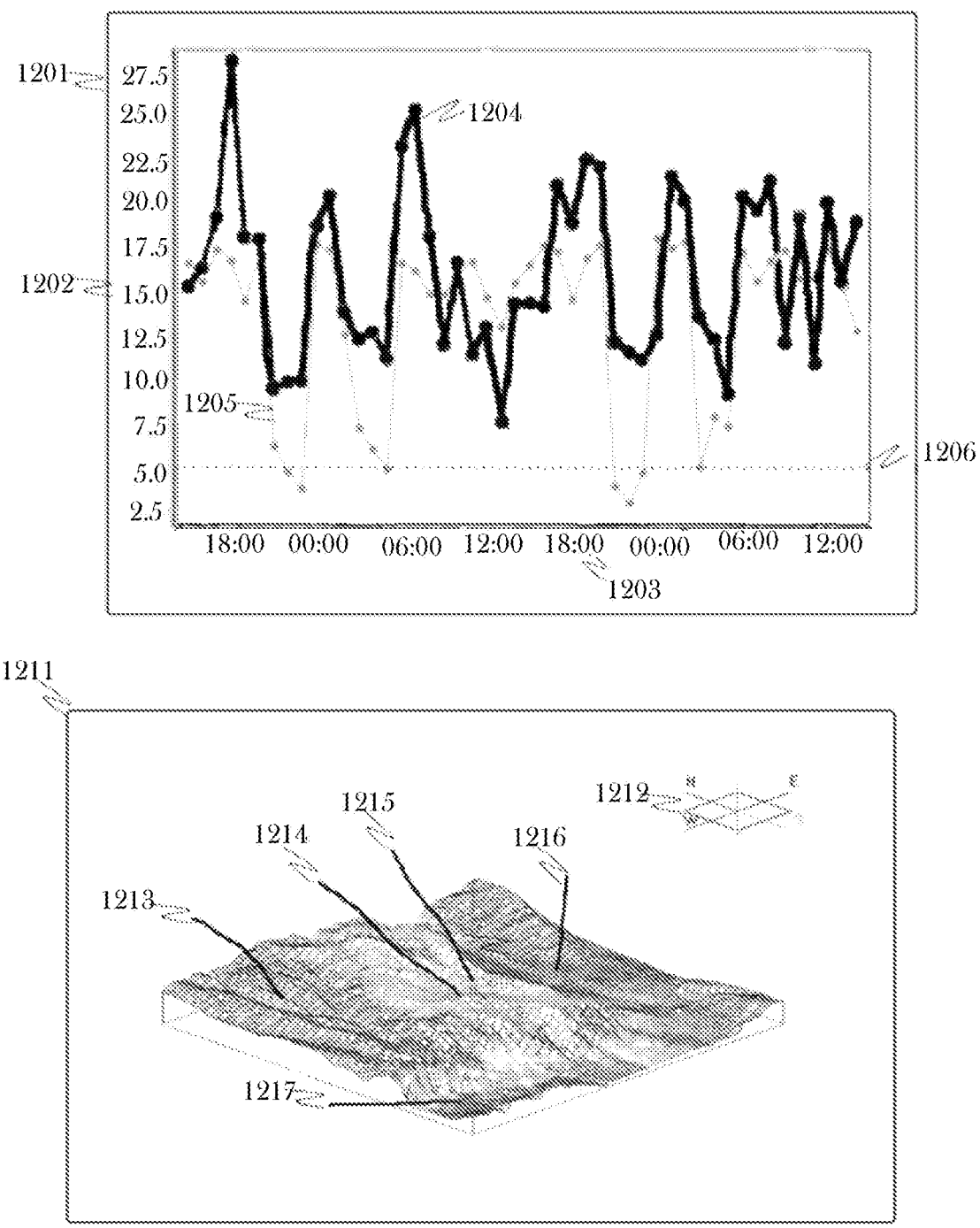
FIG. 12 is a diagram displaying two example formats of wireless service quality test output according to a preferred embodiment of the invention.
Figure 13:
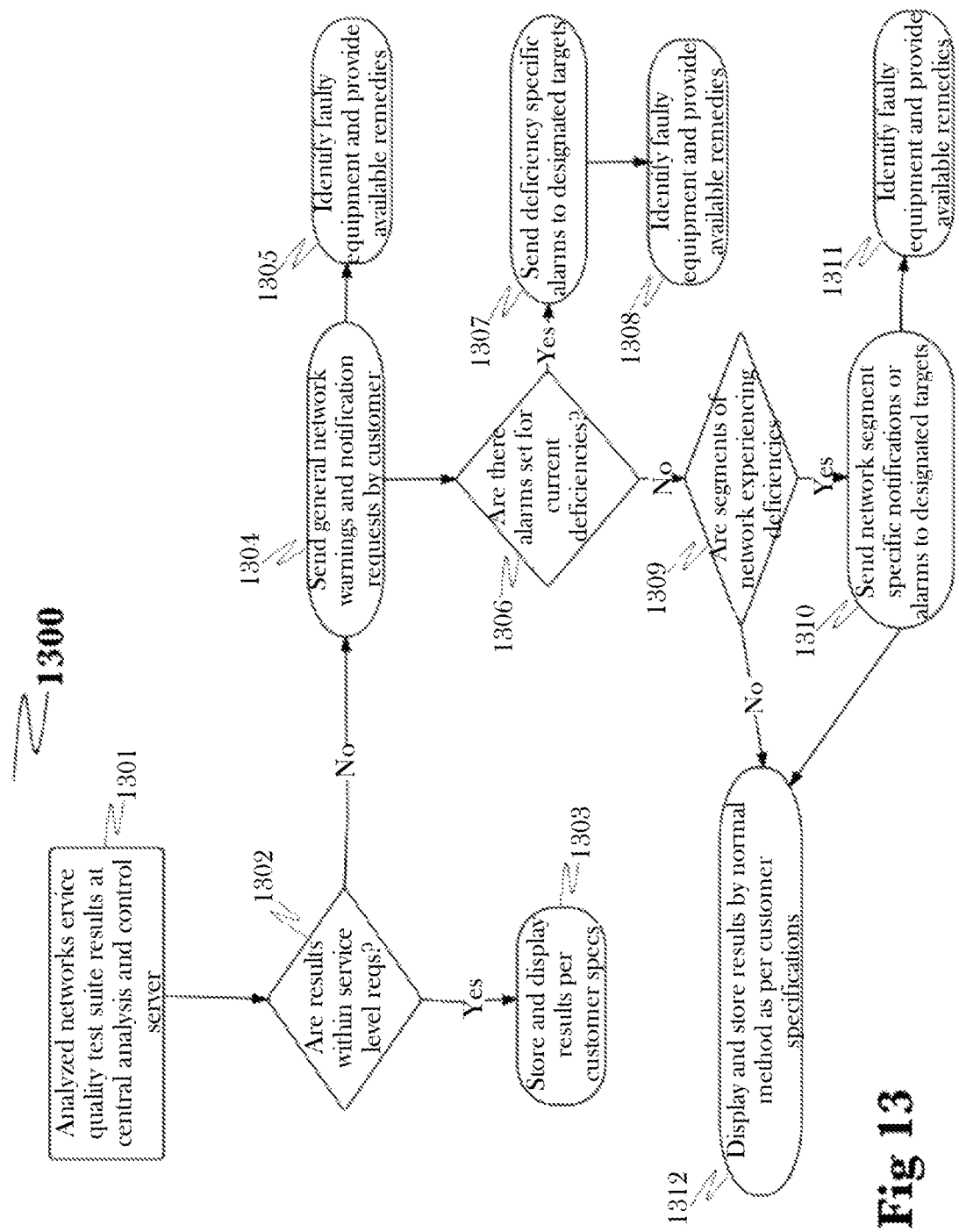
FIG. 13 is a flow diagram of a possible notification, warning and alarm mechanism to be used when network performance is found to be below customer established service level minimums according to a preferred embodiment of the invention.

FIG. 12 is a diagram displaying example forms of wireless service quality test output according to a preferred embodiment of the invention 1200. The invention can display both interim and final results of wireless service quality analysis in a large plurality of ways and display method may be significantly affected by the desires and needs of individual customers. Multiple exemplary display methods from one or more embodiments of the invention are shown in FIG. 12A, and FIG. 12B. The first example, 1201 illustrates the use of line graphs to show one aspect of wireless network performance, file download from a remote network server to mobile network service quality devices 710 on two separate wireless networks 1204, 1205. The x-axis denotes time in hours with six hour intervals specifically labeled 1203. The y-axis denotes download speed in megabits per second 1202. It can be seen that download speed varies significantly over time for both tested network 1 1204 and tested network 2 1205 and variance is cyclic for both networks. The variance is highly synchronized between the two networks with valleys of bandwidth occurring largely concurrently for both network. It should also be noted that for both tested network 1 1204 and network 2 1205, these lows fall below service quality minimum set by the customer for this activity 1206 where warnings may be sent out. Notifications may thus be sent to administrators, technicians, and managers per the customer's problem handling plan. Further, during the test period shown, the performance quality of network 2 1205 falls below the level designated by the customer as "critical" on multiple occasions. These events may lead to more drastic notification of a wider group of people within the customer company and may also lead to the activation of one or more alarms to signify critical status as is illustrated in FIG. 13.

A second example 1211 shows a pseudo-topographical map which may be superimposed over the floorplan of the area served by a wireless network, or may depict individual wireless access point designations as markers and which relies on the location of wireless network service quality devices. This map conveys three parameters important to wireless network performance: shading represents congestion and retransmission levels with darker shading denoting diminishing service quality; The height of the graph denotes wireless signal strength; and the lines denote user reported wireless service experience with denser groupings indicating diminishing user service quality experience. The pin at 1215 denotes a wireless access point and the expected high signal strength is seen 1214. 1213 shows that although the signal strength is somewhat diminished with distance from the access point 1215 and test measured congestion and packet retransmission level appear relatively high, user experience is good to excellent. Two apparent problem areas for this network appear to be at 1216 and 1217 where test measured signal strengths are low, test measured network congestion and packet retransmission levels are high and user reported service quality experience is very poor. These results allow the company to take action if desired. Legend 1212 represents a compass bearing to give an external reference.

A third example shown in FIG. 12B, 1220 depicts a map of functional wireless network coverage for a specific customer 1221. This coverage map is the result of programmatic transformation by the central control and analysis server followed by display in a format that may be specific to or modified for the needs of the customer. This example should not be seen to limit the capabilities of the invention to display of network parameter data using maps or the complexity that such display may attain but is meant only to introduce such map use in an easy to visualize method.

A fourth example is a set of graphs illustrating test results from a subset of the network parameters from a plurality of possible parameters which include ping response time 1230; web page download time 1240; network packet throughput 1260; voice over IP voice quality 1270; TCP download throughput 1250; and TCP upload throughput 1280 from a specific network device. All graphs measure service parameter quality as a function of time 1232, 1242, 1252, 1262, 1272, 1282. The graphs for ping response time 1230, web page download time 1240, network packet throughput 1260 and voice over IP voice quality 1270 report those parameters with respect to customer service level agreement (SLA) requirements 1231, 1241, 1261, 1271 with service level plotted as the percentage of that SLA 1233, 1243, 1263, 1273. Each graph shows a percentage of customer SLA that would lead to warning notifications 1234, 1244, 1264, 1274 being sent as illustrated in FIG. 13. Some of the graphs plot parameters on which the customer relies to have functioning at or very near 100% of their SLA level 1240, 1260 1270 whereas the embodiment is set to warn those designated only after ping response drops below approximately 80% of the customer's SLA 1234. All four graphs also have a critical service level set 1235, 1245, 1265, 1275. Service levels below these critical set points may cause more extreme notifications to be sent, possibly to a larger group of designated customer representatives and alarms may also be activated 1300. As an example of such a situation, it can be seen in the ping response time graph 1230 that service level not only falls below the level where warnings may be sent 1234, but falls below 1236 the customer's "critical" service level 1235. This may lead to alarms being activated at that time, possibly per the process illustrated in FIG. 13. The last two graphs 1250 and 1280 are plotted using time 1252, 1282, but use the less derived measure of Mbit/s for the y-axis 1251, 1281 with the extent of the y-axis fitted closely to the maximal throughput 1253, 1283 in both of these situations, warnings 1254, 1284 and critical notifications 1255, 1285 are both set such that a network failure would be required, or were not set by the customer. SLA and MBits/s are two examples of measurements that may be graphed by the invention but are not exhaustive. The invention may be used to display any measurement known to those skilled in the art and appropriate to the parameter being displayed.

FIG. 13 is a flow diagram of a possible notification, warning and alarm mechanism to be used when network performance is found to be below customer established service level minimums according to a preferred embodiment of the invention 1300. Wireless service quality test results once analyzed 1301 by the central analysis and control server 410, may be compared to customer service level requirements 1302. Often all results will be above customer minimums and those results may be display according customer specifications 1303. Otherwise, network wide notifications 1304 will be sent to those representatives designated by the company according to the customer's notification policy. Messages or readouts identifying the faulty equipment or suggesting remedial steps as calculated by the central analytics engine module 445 may also be sent or displayed 1305. If there are customer alarms set for the determined deficiencies 1306, signals to activate those alarms will be sent 1307. Again, messages or readouts identifying the faulty equipment or suggesting remedial steps as calculated by the central analytics engine module 445 may be sent of displayed 1308. It is also possible that the analyzed test results show that only a specific portion of the wireless network tested is impacted 1309, if the customer has policy for such circumstances those will be followed 1310, if not the information may be included in any general network notifications. Once again, messages or readouts identifying the faulty equipment or suggesting remedial steps 1311 as calculated by the central analytics engine module 445 may be sent of displayed. In all cases the test data will be displayed on the interactive terminal 480 and placed in long-term storage 1312.

FIG. 18 is a diagram illustrating a change of access point during wireless network user roaming, according to an embodiment of the invention 1800. Roaming within an area of network coverage by a user with a mobile device along a spatial dimension 1802 may present special challenges for network service quality, especially during certain network tasks. The issue may occur at a point where signal strength 1801 of a first access point 1804 decreases and signal strength of a second, adjacent access 1803 point increases to the point where the user's network device switches connection from the first access point to the second access point at a particular time 1817. As illustrated, this event 1817 may be configured such that the signal level from the first access point 1804 will have decreased significantly below 1806 the available signal strength 1805 of the second access point 1803, towards which the user is traveling, before the wireless device switches access points at time 1817 so as to minimize rapid, repetitive, switches of the device from one to the other access point. The point of the roaming event 1817 at access point coverage boundaries may be mapped, and is affected by several factors including but not limited to environment (such as weather), mobile or transient obstructions, user device characteristics, and radio interference from other equipment.

The rate of occurrence of roaming events 1817 is minimized as, during each event 1817, there is a period of time, usually quite small, where the user device is breaking down the connection to the first access point 1807 and establishing the connection with the second access point 1809; during this time packets may be lost 1808, incurring an effective "roaming delay". Often, this event will go unnoticed by the user as the lost packets are retransmitted and the packet stream at the point of the roaming event 1817 reassembled with no noticeable effect. Some applications, such as (but not limited to) voice over IP, are highly sensitive to packet loss and loss of coherence or stutter may occur at points of roaming delay 1808. It is also possible that operation of one or more of the access points in a customer's network may lead to either static or transient elongation of roaming delay events 1808, which may lead the customer to implement an embodiment of the invention that tests this parameter at critical boundaries within the network.

Figure 19:
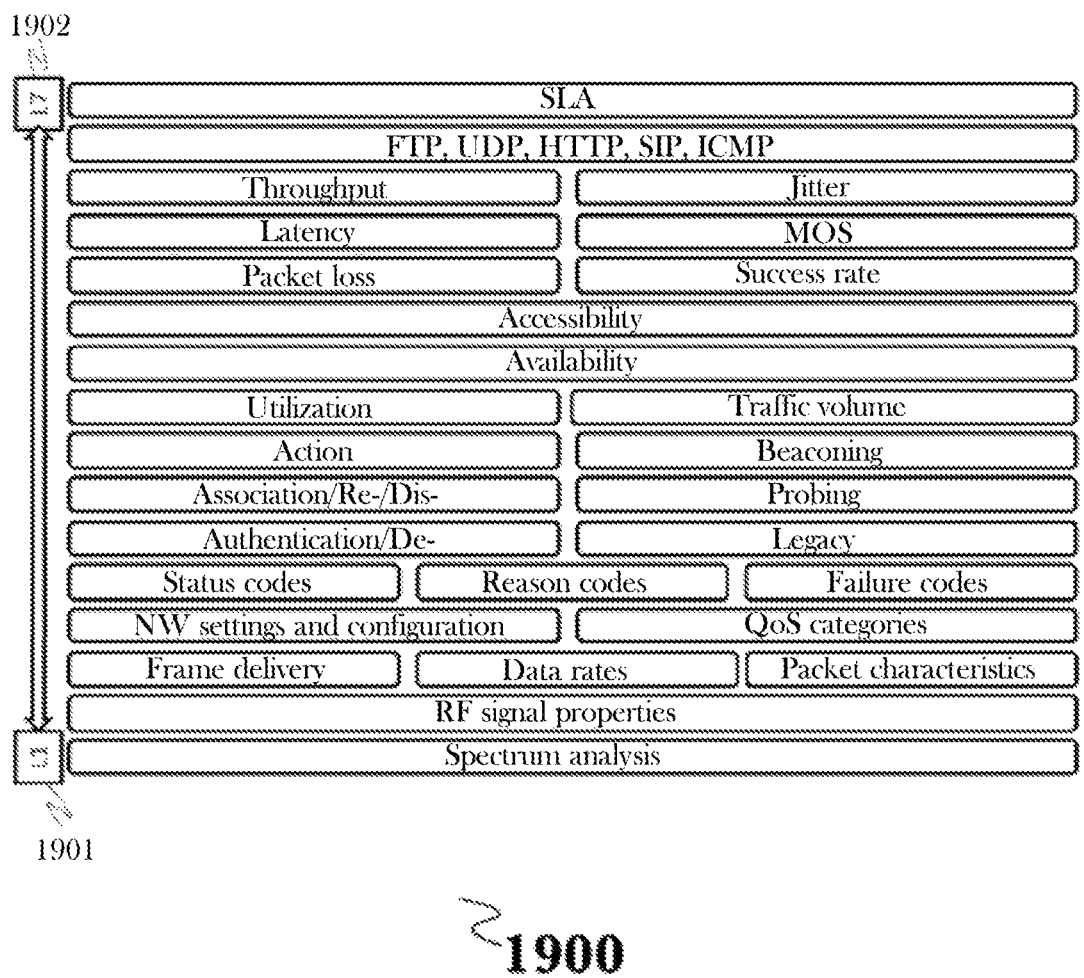
FIG. 19 is a table of network parameters that may be tested according to an embodiment of the invention.

FIG. 19 is a table 1900 of network parameters that may be tested according to an embodiment of the invention. There are many network parameters that are measurable, many of which may be of great importance to customers reliant on knowing and maintaining the service quality level of their wireless networks at one or more sites, and which can be tested and analyzed by embodiments of the invention. These measurable and analyzable parameters range from level 1 1901 of the OSI model to level 7 1902 of that model. A non-exhaustive listing of testable parameters at each OSI level are listed in table 1900. These range from radio spectrum analysis of bands associated with wireless network function and properties of the radio signals at the network site at the physical level; beaconing, and traffic volume at the network level; and packet loss and throughput of UDP, TCP and ICMP packets at the transport level, just to list a few examples from the already somewhat limited example listing 1900. This list 1900 is purely illustrative and the absence of a parameter from the listed parameters does not at all imply that the invention is incapable of probing its functional level. The invention is designed to probe any measurable parameter known to those skilled in the art and requested by customer specification.

Figure 27:
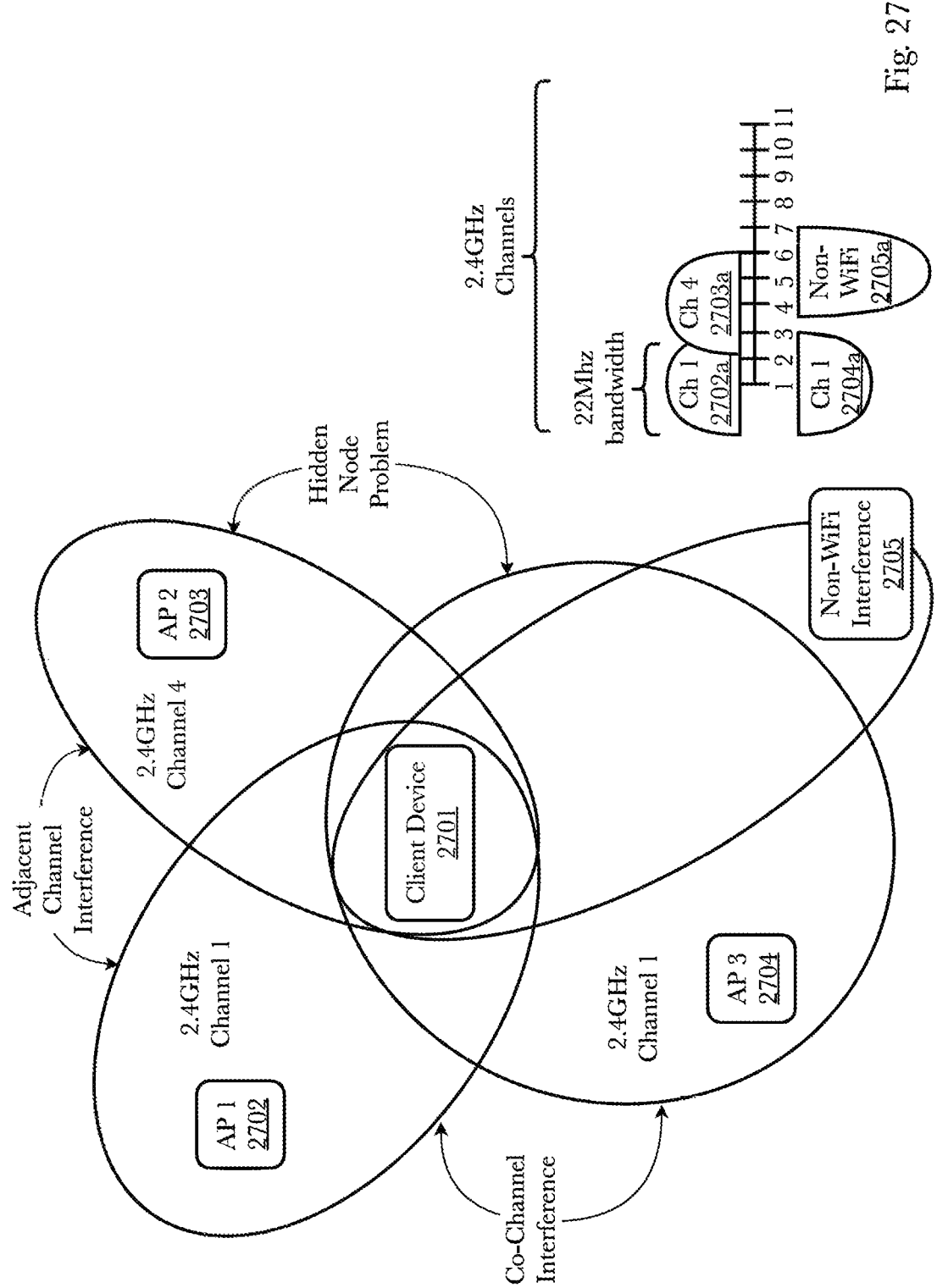
FIG. 27 is a diagram showing an example of problem detection using multi-factor event correlation.

FIG. 27 is a diagram showing an example of network performance problem detection using multi-factor event correlation. Multi-factor event correlation is a technique whereby one or more client devices 2701 are used to infer actual or potential problems with network performance where such information is not otherwise available to the network. In effect, the client device(s) 2701 are used as external sensors to the network to detect events and conditions external to the network, such as coverage problems, co-channel and adjacent-channel interference, hidden node problems, roaming problems, latency, jitter, throughput problems, and connectivity problems. In multi-factor event correlation, the "view" or "perspective" of the network from the client device provides key information about the wireless network's performance at the location of the client device. Since the client device is at a location where no other network device is located (in most cases), the client device is the only device that can provide information to the network about wireless network performance at that location. As an example, there may be a dead zone or dead spot in network coverage in a certain area for any number of reasons (walls, cabinets, elevator shafts etc.). A user passing through that dead zone will experience a loss or significant depredation of network performance. The user knows that there's a dead zone in network coverage at that location, but the network provider has no way of knowing the dead zone exists. The user's (and the user's client device's) "view" or "perspective" from that location provides the only data indicating that the dead zone exists. If the user's client device is configured to provide network performance data from that location and location information, it effectively becomes an additional network performance sensor for the network at that location that was not otherwise available.

Multi-factor event correlation may use both active and passive testing, and may correlate the results of those tests against other known or measured network event information to infer problems with network performance. Active testing includes testing and measurement initiated by the client device such as initiation of connection attempts, initiation of data transmission and receipt (e.g., bandwidth, and speed/data rate testing), initiation of audio/voice calls, throughput testing, and server pings to determine connectivity. Passive testing includes testing and measurement of events to which the client device is exposed, but which have not necessarily been initiated by the client device, such as existing connections, available signals and their strength, data packet capture analysis, and the geolocation of the client device.

In this example, a client device 2701 is within range of three access points 2702, 2703, 2704, and one source of non-WiFi interference 2705. The ovular shapes indicate an area of signal strength from each signal source, and are non-circular as a representation of the possible effect of objects and materials that may affect the distance a signal travels in some directions (e.g. buildings, walls, terrain, etc.). This example shows four different interference problems that may arise in a location in which multiple signal sources are present. A client device configured to report network performance data from the particular location at which the client device is located provides unique data from the view or perspective of the client device about performance at that particular location.

In an example of co-channel interference, access point 1 2702 and access point 3 2704 are both transmitting on channel 1 in the 2.4 GHz WiFi band, as shown in 2702a and 2704a which show the amount of overlap between the signals and the 11 channels allocated to the 2.4 GHz band in North America. Since WiFi signals are broadcast digital radio signals, more than one WiFi device transmitting simultaneously on the same channel (i.e., the same frequencies) within a given band will cause direct interference and none of the signals will be decodable by any receiving device (e.g., the client device 2701). To avoid this problem, access points may be configured to share the channel by not transmitting if a transmission on that channel is detected. This results in clean signal transmission, but reduces the throughput of each access point in proportion to the number of other access points trying to transmit on the same channel. The client device view or perspective can help detect co-channel interference because, from its location, it is receiving signals on channel 1 from both AP 1 2702 and AP 3 2704, which it can report to the network.

In an example of adjacent-channel interference, access point 1 2702 and access point 2 2703 are transmitting on nearby channels, as shown in 2702a and 2703a, wherein the 22 MHz-wide signals from channel 1 and channel 4 overlap to a significant degree. If both AP 1 and AP 2 are transmitting at the same time, depending on signal strength and the location of the client device relative to the access points, the signals from them may not be decodable by a receiving device (e.g., the client device 2701). Adjacent-channel interference is more problematic than co-channel interference because it is spill-over from nearby channels. The channels exhibiting adjacent-channel interference can't be effectively shared as in co-channel interference. The client device view or perspective can help detect adjacent channel interference because, from its location, it is receiving signals on channel 1 from AP 1 2702 and on channel 4 from AP 2 2703, which it can report to the network.

In an example of the hidden node problem, access point 2 2703 and access point 3 2704 are out of range of one another (i.e., then cannot see each other to determine whether one of them is transmitting on a given channel to avoid co-channel interference). The client device 2701 can receive and transmit signals to and from both access points 2703, 2704, which could result in a situation where two or more of the three devices (the client device 2701 and the two access points 2703, 2704) are transmitting at the same time which can cause interference. The hidden node problem is perhaps the best use case of the client device view or perspective. In the hidden node problem, since the access points AP 2 2703 and AP 3 2704 cannot receive signals from one another, the client device view or perspective is the only means of obtaining information about possible interference between those two access points 2703, 2704. The client device can help detect interference at its location because, from its location, it is receiving signals on channel 1 from AP 3 2704 and on channel 4 from AP 2 2703, which it can report to the network.

In an example of non-WiFi interference, a non-WiFi device 2705 such as a microwave, Bluetooth radio, or cordless phone, all of which generate transmissions in the 2.4 GHz band. These transmissions can cause signal interference with proper receipt and transmission of signals from other devices. For example, in the chart of 2.4 GHz channels, certain non-WiFi signals such as 2705a can overlap with other channels. The client device view or perspective can help detect non-WiFi interference because it may encounter signal problems from its location that it cannot associate with a recognizable network device, which it can report to the network.

By combining this information from the client device's 2701 view or perspective with active and passive testing of the connection between the client device 2701 and its current access point, inferences can be made about problems with network performance at the client device/access point level, and potential solutions such as re-configuring the channel or band used by the access point in that location. Network performance issues such as roaming problems, latency, jitter, throughput problems, and connectivity problems can be correlated with signal landscape (aka signal environment) information gathered by the client devices 2701 to identify the potential source of the problem and suggest a solution. For example, if the client device is having throughput problems, and has determined that it is near two access points that are near the edge of their usable range (e.g., a signal strength at the client device near 70 dB), the client device may infer that it the throughput problems are being caused by a hidden node problem. If the client device 2701 is a mobile device, measurements may be taken over time of the client device 2701 geolocation and the relative signal strengths of the access points to determine where the access points are located and whether changes in position of the client device 2701 fix the problem (thus confirming the hidden node problem). This client device/access point level information can be passed to the control server as data to be used in overall network performance management.

Figure 28:
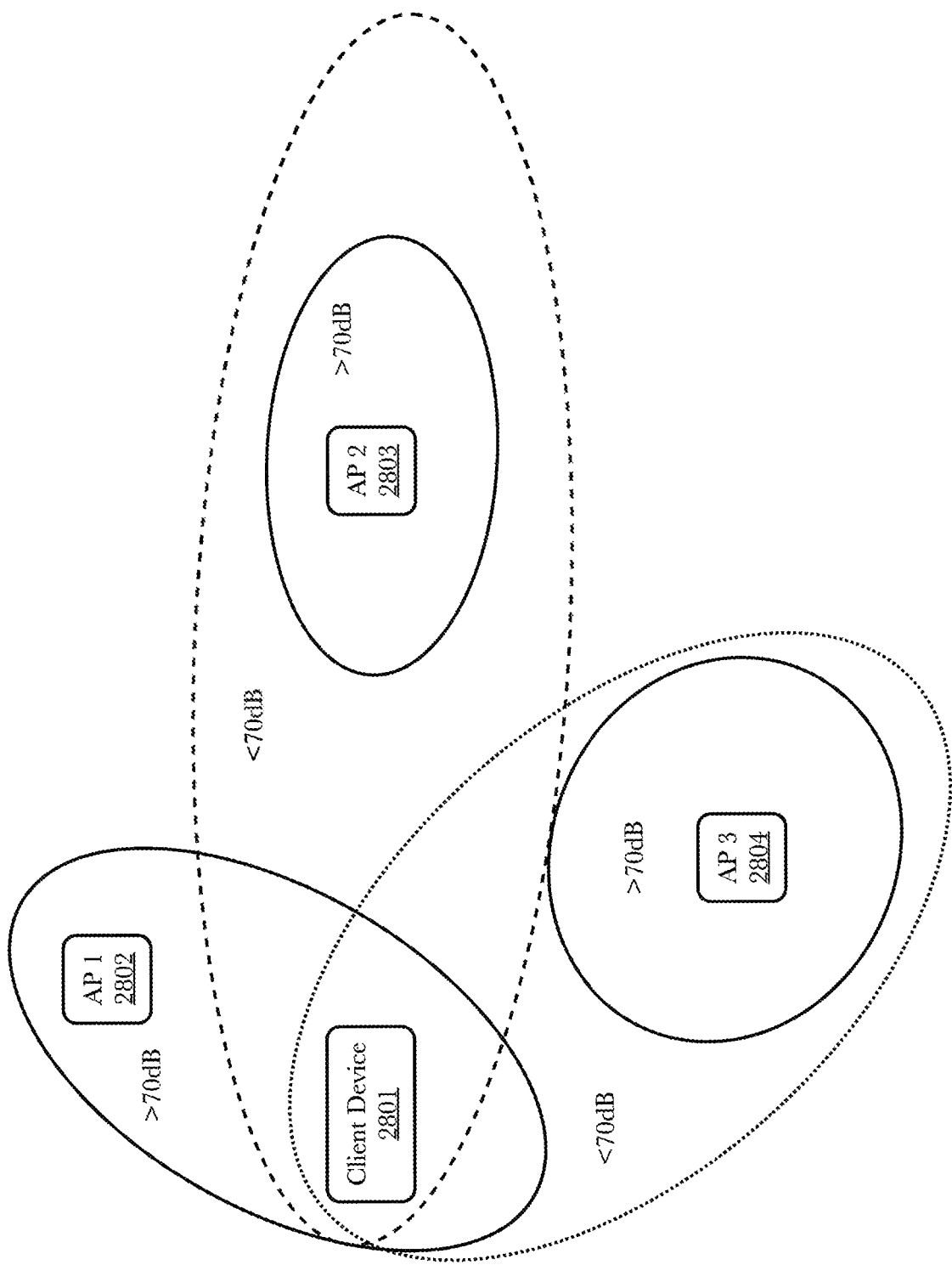
FIG. 28 is a diagram showing a signal strength insufficiency situation.

FIG. 28 is a diagram showing how client device view or perspective can help detect a signal strength insufficiency situation. Signal strength insufficiency is another type of environmental condition that can be used to infer and troubleshoot network performance issues. In this example, the client device 2801 is within the usable range of access point 1 (2802). The usable range varies according to real world conditions, but for purposes of this example is defined as >70 dB. Two other access points 2803, 2804 can be seen by the client device 2801, but are outside of the usable range. Thus, while it may appear that three access points are available, attempting to use access point 2 2803 or access point 3 2804 will result in lost data, low transmission rates, and poor performance. Again, by combining this information from the client device's 2801 view or perspective with active and passive testing of the connection between the client device 2801 and its current access point, inferences can be made about problems with network performance at the client device/access point level, and potential solutions such as instructing client devices only to connect with certain access points in a given location, despite the existence of other visible access points. Network performance issues such as roaming problems, latency, jitter, throughput problems, and connectivity problems can be correlated with signal landscape (aka signal environment) information gathered by the client devices 2801 to identify the potential source of the problem and suggest a solution. For example, if the client device is having throughput problems, and can see signals from other access points, the client device 2801 can connect with each access point in turn to see if throughput improves. If so, that information, along with client device 2801 information like geolocation, can be used to make future connectivity decisions. If the client device 2801 is a mobile device, measurements may be taken over time of the client device 2801 geolocation and the relative signal strengths of the access points to determine the area of usable signal from a given access point. This client device/access point level information can be passed to the control server as data to be used in overall network performance management.

Figure 29:
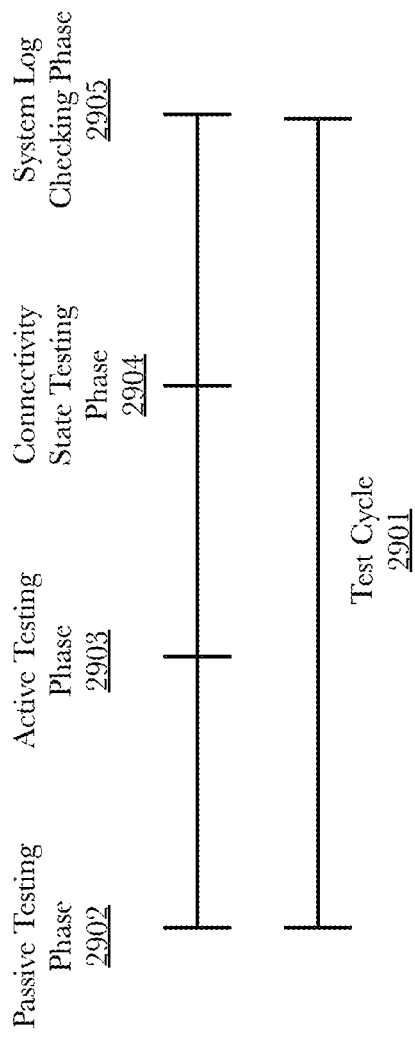
FIG. 29 is a diagram showing a test cycle for capture of network performance data by a client device.

FIG. 29 is a diagram showing a test cycle 2901 for capture of network performance data by a client device. A test cycle 2901 may comprise any number and types of testing, but in this example, the test cycle 2901 comprises a passive testing phase 2902, an active testing phase 2903, a station connectivity test phase 2904, and a system log check 2905. Active testing 2902 includes testing and measurement initiated by the client device such as initiation of connection attempts, initiation of data transmission and receipt (e.g., bandwidth, and speed/data rate testing), initiation of audio/voice calls, throughput testing, and server pings to determine connectivity. Passive testing 2903 includes testing and measurement of events to which the client device is exposed, but which have not necessarily been initiated by the client device, such as existing connections, available signals and their strength, data packet capture analysis, and the geolocation of the client device. Station connectivity state testing 2904 may include information as to whether a connection exists, to which access point the client device is connected, the signal strength of the connection, etc. The system log check 2905 may include information such as type of wireless device hardware and firmware, version of wireless device driver, client device hardware and software, operating system type and version, type of connection (e.g., WiFi, Bluetooth, etc.), speed of connection (determined by handshake), failed 802.11 authentications, DNS failures, no IP address/bad IP address, no internet connectivity, etc. The information gathered during each test cycle can be tracked over time, and combined with other information like the geolocation of the client device and the location of other nearby access points to make network performance management decisions.

Figure 30:
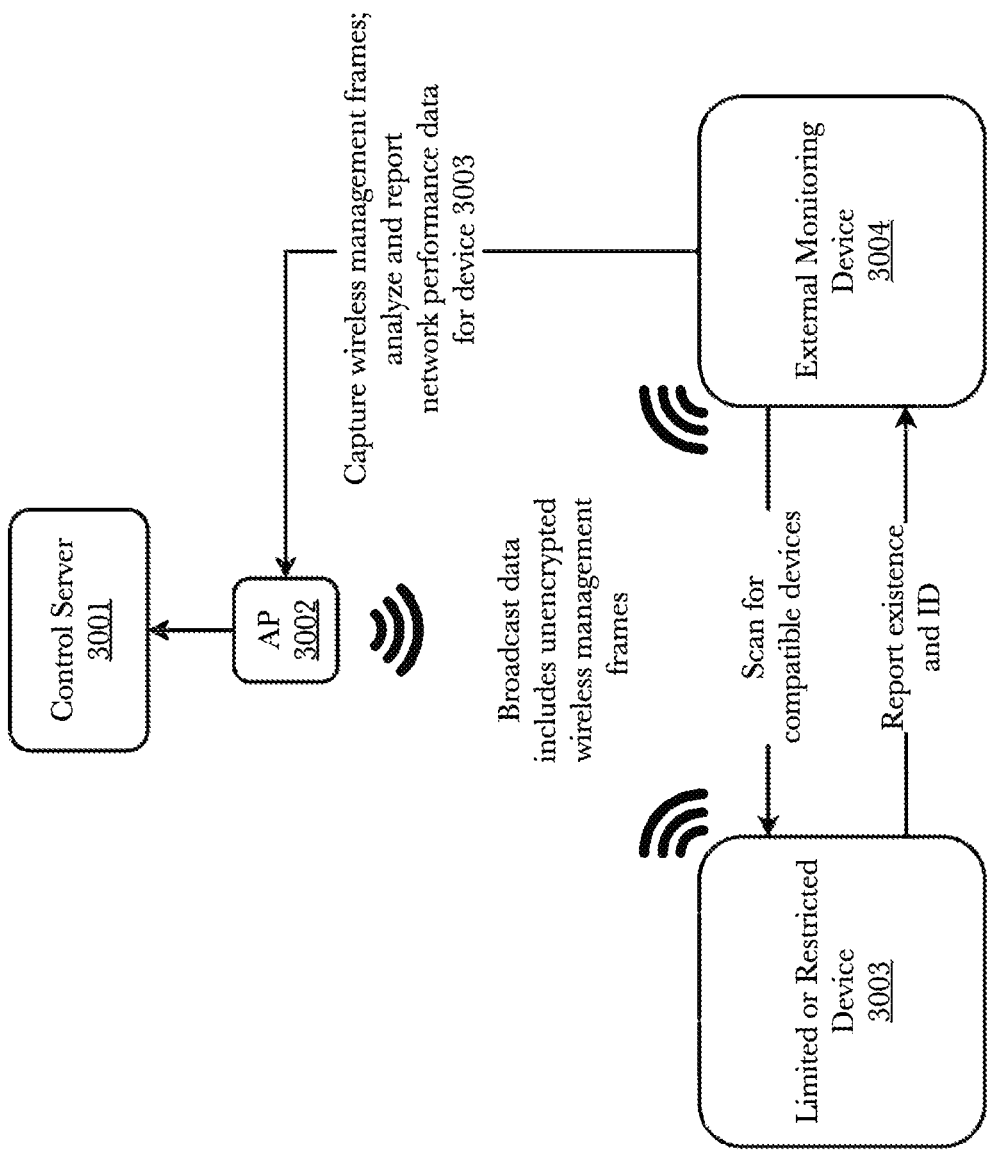
FIG. 30 is a diagram showing usage of an external monitoring device to capture and report network performance data for a different device with limitations or restrictions on network data reporting.

FIG. 30 is a diagram showing usage of an external monitoring device to capture and report network performance data for a different device with limitations or restrictions on network data reporting. In this example, a limited or restricted device 3003 with limitations or restrictions on its network performance reporting data is connected to an access point 3002, which is connected to a control server 3001. An example of a limited or restricted device 3003 is an Apple iPhone, which uses a proprietary operating system that does not allow users or developers to access the device's data about its network performance and connectivity. This is a significant drawback for many reasons, but is particularly problematic when attempting to use the limited or restricted device 3003 to report network performance data to the system for network performance management purposes. However, it is possible to use an external monitoring device 3004 to capture, analyze, and report wireless network performance data for the limited or restricted device 3003. The external monitoring device 3004 scans for compatible devices (e.g., devices that have a particular application installed, or are part of a VPN or other service that includes the external monitoring device 3004, etc.). The limited or restricted device 3003, being such a compatible device, reports its existence and identification to the external monitoring device 3004. The external monitoring device 3004 captures wireless management and control frames, which are unencrypted wireless data packets sent between devices (such as the access point 3002 and the limited or restricted device 3003) to manage and control their communications. The wireless management and control frames are distinguished from the data frames in that the wireless management and control frames must be heard and understood by all clients and therefore must be transmitted as open or unencrypted to allow negotiation of communications, whereas the data frames intended for a specific device after communications have been negotiated, and may be encrypted. The external monitoring device 3004 captures all wireless frames, identifies those associated with the limited or restricted device 3003 using the reported identification, analyzes the wireless management and control frames for network performance data such as the MCS index, number of retries, etc., and reports network performance data to the control server 3001 on behalf of the limited or restricted device 3003. If data frames are unencrypted the external monitoring device 3004 may also use them to reports network performance data such as throughput, actual datarate etc. to the control server.

In another embodiment, the limited or restricted device 3003 is not capable of reporting its own network performance data for some other reason. For example, the limited or restricted device may be an IoT device which is capable of logging connectivity data, but has limited processing power and storage, no geolocation awareness, and cannot perform analyses of the connectivity data, and may not be able to report its connectivity data to the control server 3001 through the access point 3002. In such case, the external monitoring device 3004 (which is a more capable client device with general purpose computing capabilities such as a mobile phone or desktop computer) can be provided with an identifier for the limited or restricted device 3003, and can intercept wireless frames, identify those associated with the limited or restricted device 3003, and analyze and report network performance data to the control server 3001 on behalf of the limited or restricted device 3003, as noted above. In other cases, the limited or restricted device 3003 may be configured to simply broadcast (either periodically or continuously) data regarding its connection with the access point 3002 along with a device identifier, which broadcast can be received by the external monitoring device 3004, and transmitted to the control server 3001, either through the same access point or a different one.

In another embodiment, the client device connecting to a network may be a device with limited processing or storage capabilities, such an Internet of Things (IoT) device like an Internet-capable television or an embedded system such as an Internet-capable weather checking system on an irrigation controller. In such cases, the client device may have limited analysis and reporting capabilities, but may be able to send connectivity data and a device identifier to another device for analysis and reporting. In this example, an IoT device 3003 is connected to an access point 3002, which is connected to a control server 3001. The IoT device 3003 has a device identifier and is capable of logging connectivity data, but has limited processing power and storage, no geolocation awareness, and cannot perform analyses of the connectivity data, and may not be able to report its connectivity data to the control server 3001 through the access point 3002. In such case, the IoT device may be configured to simply broadcast (either periodically or continuously) data regarding its connection with the access point 3002 along with a device identifier, which broadcast can be received by a more capable client device with general purpose computing capabilities 3004 such as a mobile phone or desktop computer. The more capable client device 3004 may also be connected to the control server 3001, either through the same access point or a different one, and may perform the analysis and reporting on behalf of the IoT device 3003. Thus, the control server gains the benefit of the connectivity data from the IoT device 3003, as analyzed and reported by a different device 3004, whose connectivity to the network may or may not be significant to managing network performance.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 14:
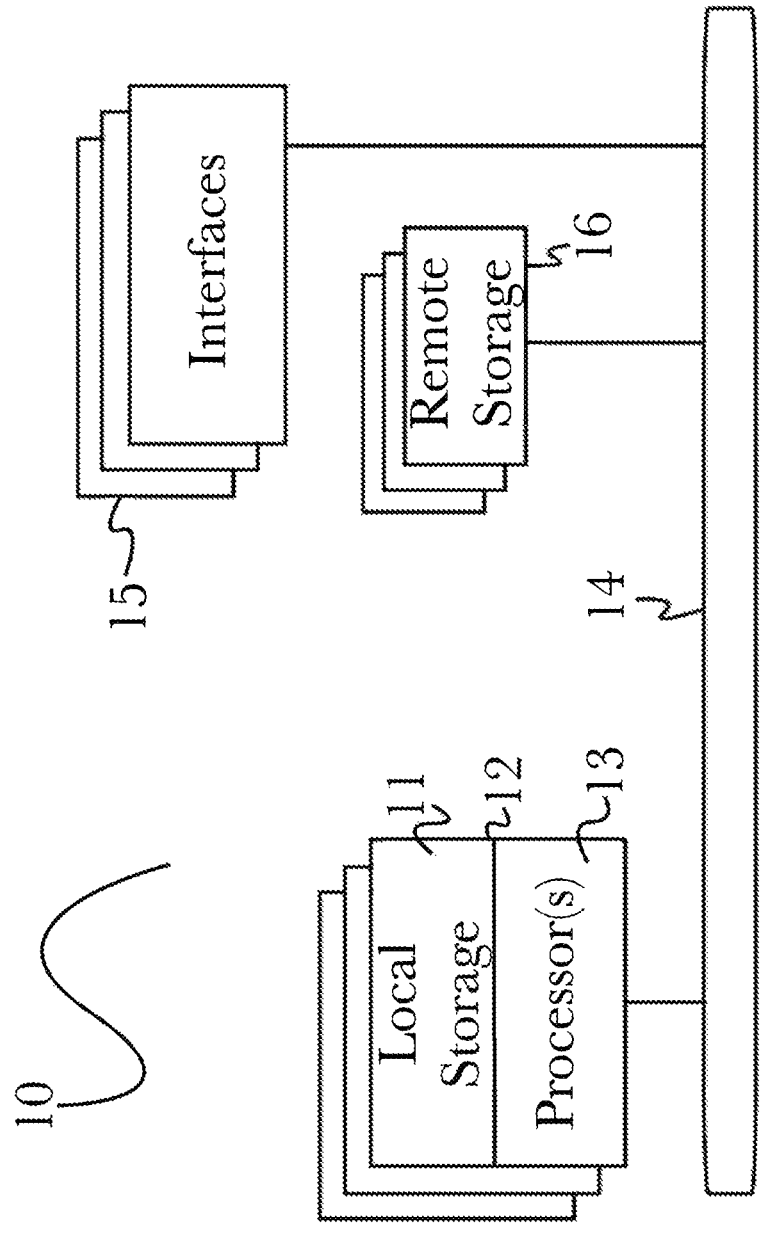
FIG. 14 is a block diagram illustrating an exemplary hardware architecture of a computing device used in an embodiment of the invention.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
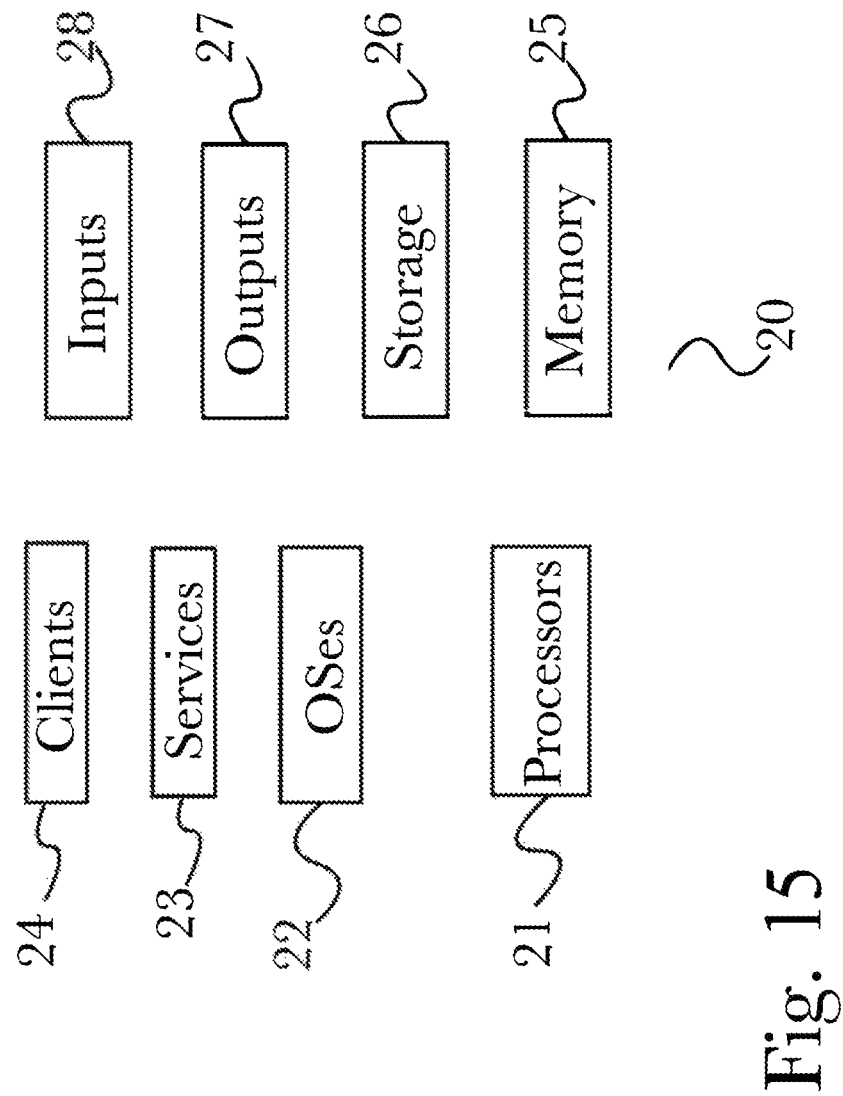
FIG. 15 is a block diagram illustrating an exemplary logical architecture for a client device, according to an embodiment of the invention.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
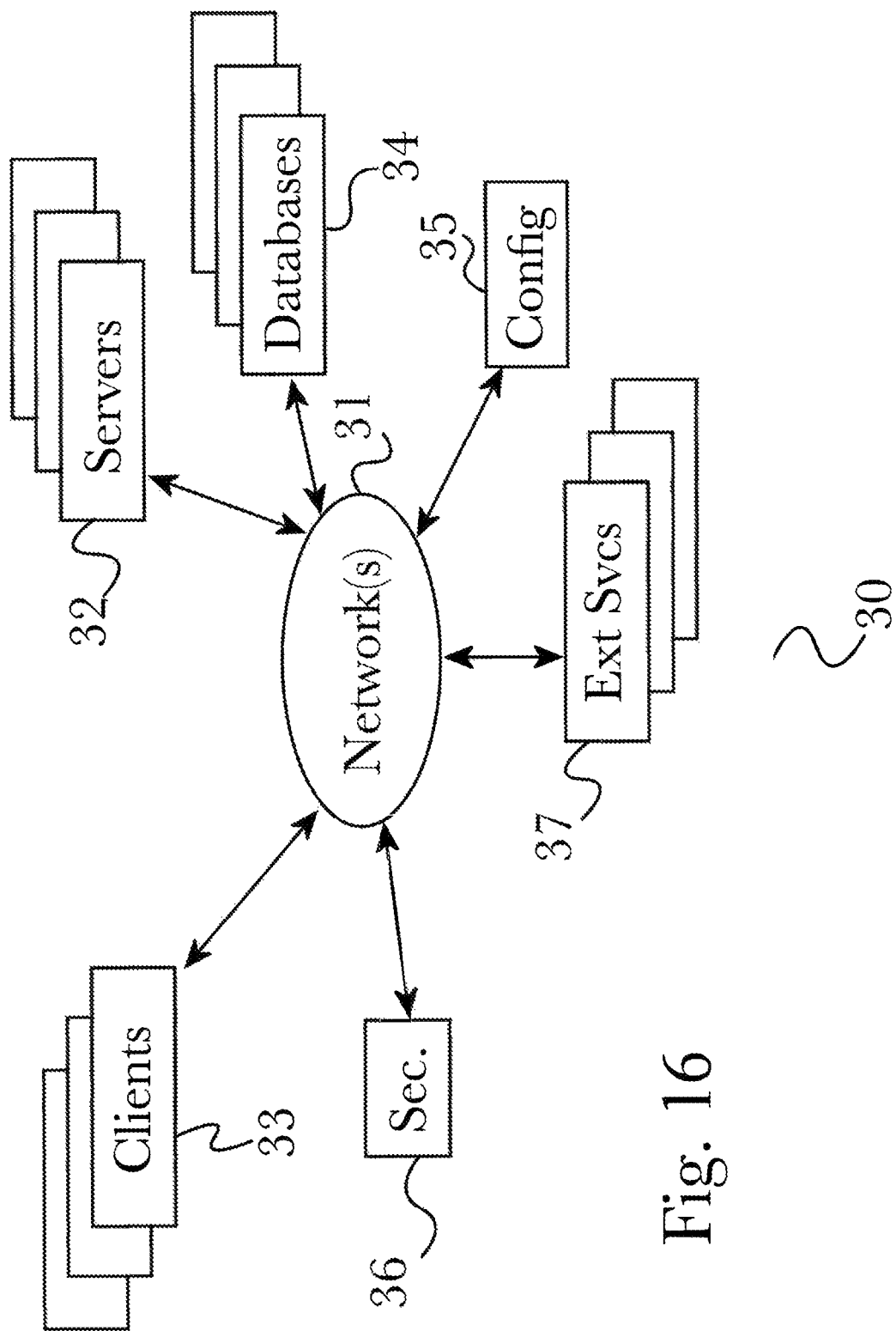
FIG. 16 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
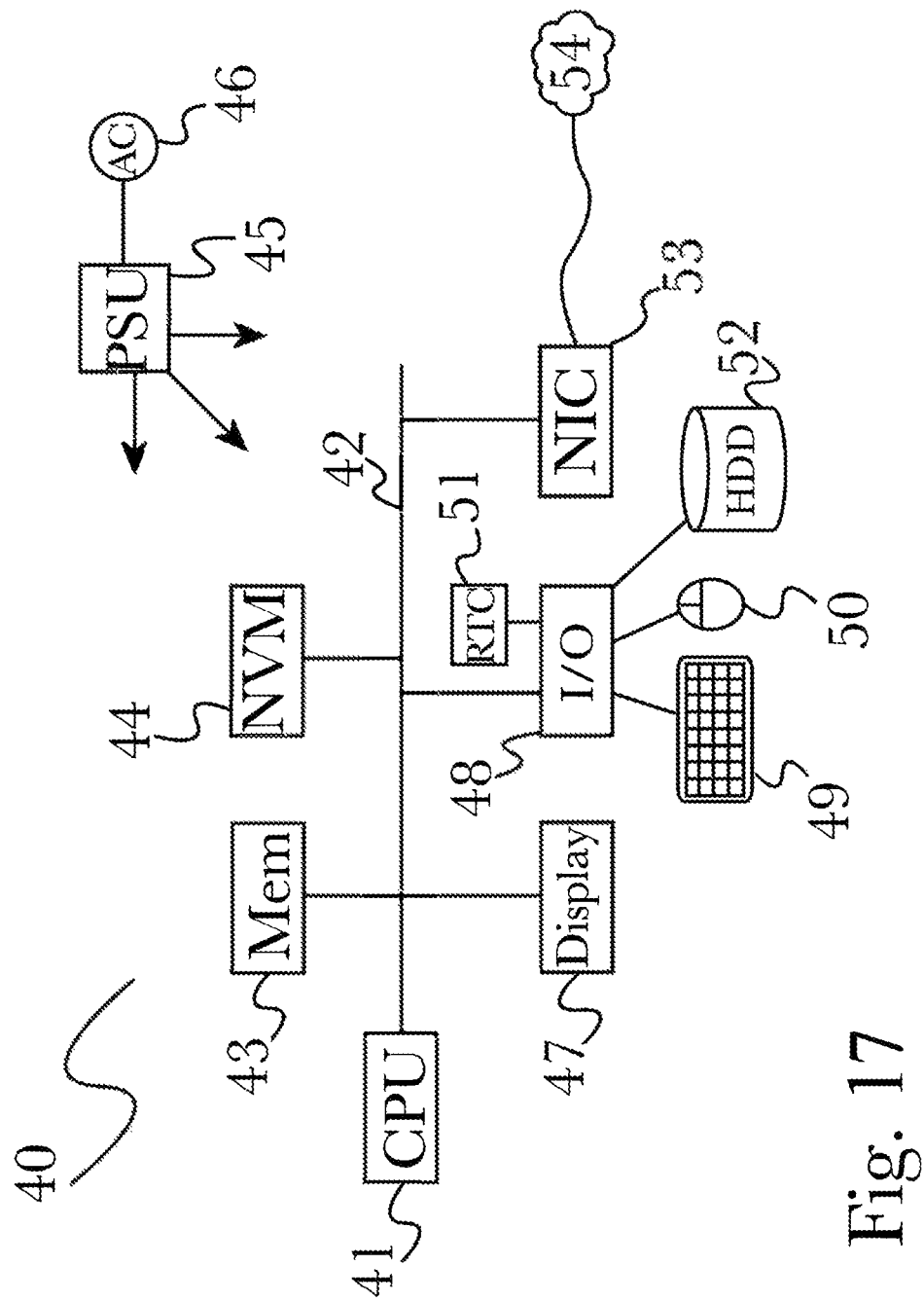
FIG. 17 is another block diagram illustrating an exemplary hardware architecture of a computing device used in a plurality of embodiments of the invention.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein.

It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A method of distributed network performance management, the method comprising:
    a) sending configuration instructions comprising a level of autonomy to each of a plurality of client devices forming a network;
    b) receiving network test data from at least some of the plurality of client devices;
    c) determining a condition of performance of the network from the network test data;
    d) changing the configuration instructions for at least one of the plurality of client devices in response to the condition of performance of the network; and
    e) performing distributed testing on at least one of the plurality of client devices, the distributed testing comprising: i) establishing a network testing regime that is based on the level of autonomy; ii) selecting a type of network testing to be performed; iii) scheduling the performance of the selected type of network testing;
    iv) selecting a granularity level for the selected type of network testing;
    v) performing the selected type of network testing to generate network test results
    vi) scheduling reporting of generated network test results of the selected type of network testing to a control server; and
    vii) reporting generated network test results to the control server; and
    f) changing the configuration instructions for at least one of plurality of client devices based on the distributed testing;
    wherein the type of network testing is a test of wireless communication performance;
    wherein the distributed testing comprises wireless performance monitoring;
    wherein the wireless performance monitoring comprises capturing wireless packet data from a wireless device driver of at least one of the plurality of client devices;
    extracting frame data from the wireless packet data; and calculating an indicator of wireless performance from the extracted frame data.

2. The method of claim 1 wherein the selecting the type of network testing to be performed is based on statistical sampling methodologies.

3. The method of claim 1 wherein the scheduling the reporting of network test results is based on statistical sampling methodologies.

4. The method of claim 1 wherein the performing the selected type of network testing to generate network test results is based on statistical sampling methodologies.

5. The method of claim 1 wherein the control server comprises a third-party server.

6. The method of claim 1 further comprising performing a distributed testing application installed on at least two of the plurality of client devices.

7. The method of claim 1 further comprising performing a distributed testing application that causes a client device to establish a network testing regime based on the level of autonomy and then to report network test results to the control server.

8. The method of claim 7 further comprising selecting a granularity level for the network testing regime.

9. The method of claim 7 further comprising adjusting the network testing regime based on a service level.

10. The method of claim 1 further comprising monitoring of a parameter of network performance and increasing network testing frequency in response to the monitoring.

11. The method of claim 1 further comprising monitoring of a parameter of network performance and increasing the granularity level in response to the monitoring.

12. The method of claim 1 further comprising monitoring of a parameter of network performance and decreasing network testing frequency in response to the monitoring.

13. The method of claim 1 further comprising monitoring of a parameter of network performance and decreasing the granularity level in response to the monitoring.

14. The method of claim 1 further comprising determining the configuration instructions.

15. The method of claim 14 wherein the configuration instructions comprise instructions to capture geolocation data regarding at least one of the plurality of client devices geolocation.

16. The method of claim 15 further comprising providing the captured geolocation data in conjunction with the generated network test results.

17. The method of claim 14 wherein the configuration instructions comprise instructions to send generated network test results to a third-party server for analysis and reporting.

18. The method of claim 14 wherein the configuration instructions comprise instructions to send detailed test results to a third party while sending only results at a level of detail required by the control server to manage the statistical sampling and testing regimes to the control server.

* * * * *